(12) United States Patent (10) Patent No.: US 12,587,760 B2

Shim (45) Date of Patent: Mar. 24, 2026

(54) IMAGE SENSOR INCLUDING AN AUTO FOCUSING (AF) PIXEL

(71) Applicant: SAMSUNG ELECTRONICS CO., LTD., Suwon-si (KR)

(72) Inventor: Eun Sub Shim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 328 days.

(21) Appl. No.: 18/110,038

(22) Filed: Feb. 15, 2023

(65) Prior Publication Data

US 2024/0022832 A1 Jan. 18, 2024

(30) Foreign Application Priority Data

Jul. 13, 2022 (KR) ......................... 10-2022-0086053

(51) Int. Cl.
 H04N 25/704 (2023.01)
 H04N 25/772 (2023.01)
 H04N 25/79 (2023.01)
(52) U.S. Cl.
 CPC ......... H04N 25/704 (2023.01); H04N 25/772 (2023.01); H04N 25/79 (2023.01)
(58) Field of Classification Search
 CPC ..... H04N 25/704; H04N 25/772; H04N 25/79
 USPC ......................................................... 348/308
 See application file for complete search history.

(56) References Cited

U.S. PATENT DOCUMENTS

| | | | |
|---|---|---|---|
| 9,762,821 B2 | 9/2017 | Lee et al. | |
| 10,205,905 B2 | 2/2019 | Koh et al. | |
| 11,190,716 B2 | 11/2021 | Kim et al. | |
| 2018/0124337 A1 | 5/2018 | Kim | |
| 2021/0028204 A1 | 1/2021 | Fujita et al. | |
| 2021/0120168 A1* | 4/2021 | Shim .................... | H04N 23/667 |
| 2021/0151481 A1 | 5/2021 | Maehashi | |
| 2021/0175269 A1 | 6/2021 | Fujita et al. | |

FOREIGN PATENT DOCUMENTS

| | | |
|---|---|---|
| JP | 4696877 | 3/2011 |
| KR | 10-1032174 | 5/2011 |

* cited by examiner

*Primary Examiner* — Joel W Fosselman
(74) *Attorney, Agent, or Firm* — Morgan, Lewis & Bockius LLP

(57) ABSTRACT

An image sensor includes; a pixel array including at an auto focusing (AF) pixel and an AF adjacent pixel, which is adjacent to the AF pixel and is configured to share a floating diffusion region with the AF pixel; and a row driver configured to control the pixel array, wherein a first end of a photo diode included in the AF pixel is connected to a first transmission transistor, and a second end of the photo diode included in the AF pixel is connected to a ground through a first signal line, and wherein a first end of a photo diode included in the AF adjacent pixel is connected to a second transmission transistor, and a second end of the photo diode included in the AF adjacent pixel is connected to the row driver through a second signal line.

10 Claims, 23 Drawing Sheets

PG_AF1

PX_AFX

PX_AFX

IMAGE SENSOR INCLUDING AN AUTO FOCUSING (AF) PIXEL

CROSS-REFERENCE TO RELATED APPLICATION

This application claims priority under 35 U.S.C. § 119 to Korean Patent Application No. 10-2022-0086053 filed on Jul. 13, 2022, in the Korean Intellectual Property Office, the disclosure of which is incorporated by reference herein in its entirety.

TECHNICAL FIELD

Embodiments of the present disclosure relate to an image sensor, and more particularly, to an image sensor including an auto focusing (AF) pixel.

DISCUSSION OF RELATED ART

Complementary metal-oxide semiconductor (CMOS) image sensors are image capturing devices manufactured using CMOS processes. Charge-coupled device (CCD) image sensors are image capturing devices based on MOS technology. The CMOS image sensors have lower manufacturing costs and smaller pixel sizes than the CCD image sensors including high-voltage analog circuits. Accordingly, the CMOS image sensors have lower power consumption than the CCD image sensors. Furthermore, as the performance of the CMOS image sensors is improved, the CMOS image sensors are seeing increased use in mobile electronic devices such as smart phones, tablet personal computers (PCs), and digital cameras.

A digital image capturing device, such as a camera, provides an auto focusing (AF) function. To achieve an AF function, detection of a focus adjustment state of a photographing lens is required. When a device for focus detection is included in the digital image capturing device along with an image sensor, the cost and the size of the digital image capturing device may be increased. Accordingly, an AF image sensor capable of performing both an image capturing function and an AF function is being studied.

SUMMARY

Embodiments of the present disclosure provide an image sensor for providing an accurate auto focusing (AF) function.

Embodiments of the present disclosure provide an image sensor including: a pixel array including at an AF pixel and an AF adjacent pixel, which is adjacent to the AF pixel and is configured to share a floating diffusion region with the AF pixel; and a row driver configured to control the pixel array, wherein a first end of a photo diode included in the AF pixel is connected to a first transmission transistor, and a second end of the photo diode included in the AF pixel is connected to a ground through a first signal line, and wherein a first end of a photo diode included in the AF adjacent pixel is connected to a second transmission transistor, and a second end of the photo diode included in the AF adjacent pixel is connected to the row driver through a second signal line.

Embodiments of the present disclosure provide an image sensor including: a pixel array and a row driver configured to control the pixel array, wherein the pixel array includes: a first photo diode; a first transmission transistor having a first end connected to the first photo diode and a second end connected to a floating diffusion region; a second photo diode; a second transmission transistor having a first end connected to the second photo diode and a second end connected to the floating diffusion region; a double conversion gain transistor connected to the floating diffusion region; and a dynamic range capacitor having a first end connected to the floating diffusion region through the double conversion gain transistor, and wherein a first end of the first photo diode is connected to a ground through a first signal line, and s second end of the second photo diode is connected to the row driver through a second signal line.

Embodiments of the present disclosure provide a pixel array including: a pixel group configured to generate an image signal; and an AF pixel group configured to generate a phase signal, wherein the AF pixel group includes: a first photo diode; a first transmission transistor connected to the first photo diode; a second photo diode; a second transmission transistor connected to the second photo diode; and a floating diffusion region connected to the first and second photo diodes through the first and second transmission transistors, and wherein a ground level voltage or a high level voltage is selectively provided to a first end of the first photo diode, and a ground level voltage is provided to a first end of the second photo diode.

BRIEF DESCRIPTION OF THE FIGURES

The above and other features of the present disclosure will become apparent by describing in detail embodiments thereof with reference to the accompanying drawings.

FIG. 20 is a detailed view illustrating a connection relationship between a first AF pixel group of the pixel array of FIG. 19 and the row driver.

FIG. 22 is a timing chart for describing an operation of the first AF pixel group of FIGS. 19 to 21.

DETAILED DESCRIPTION OF THE EMBODIMENTS

Hereinafter, embodiments of the present disclosure will be described clearly and in detail so that those skilled in the art can implement the present disclosure.

An auto focusing pixel is hereinafter referred to as an AF pixel and a pixel adjacent to the AF pixel is hereinafter referred to as an AF adjacent pixel.

[Image Sensor for Selectively Deactivating Photo Diode of AF Adjacent Pixel]

Figure 1:
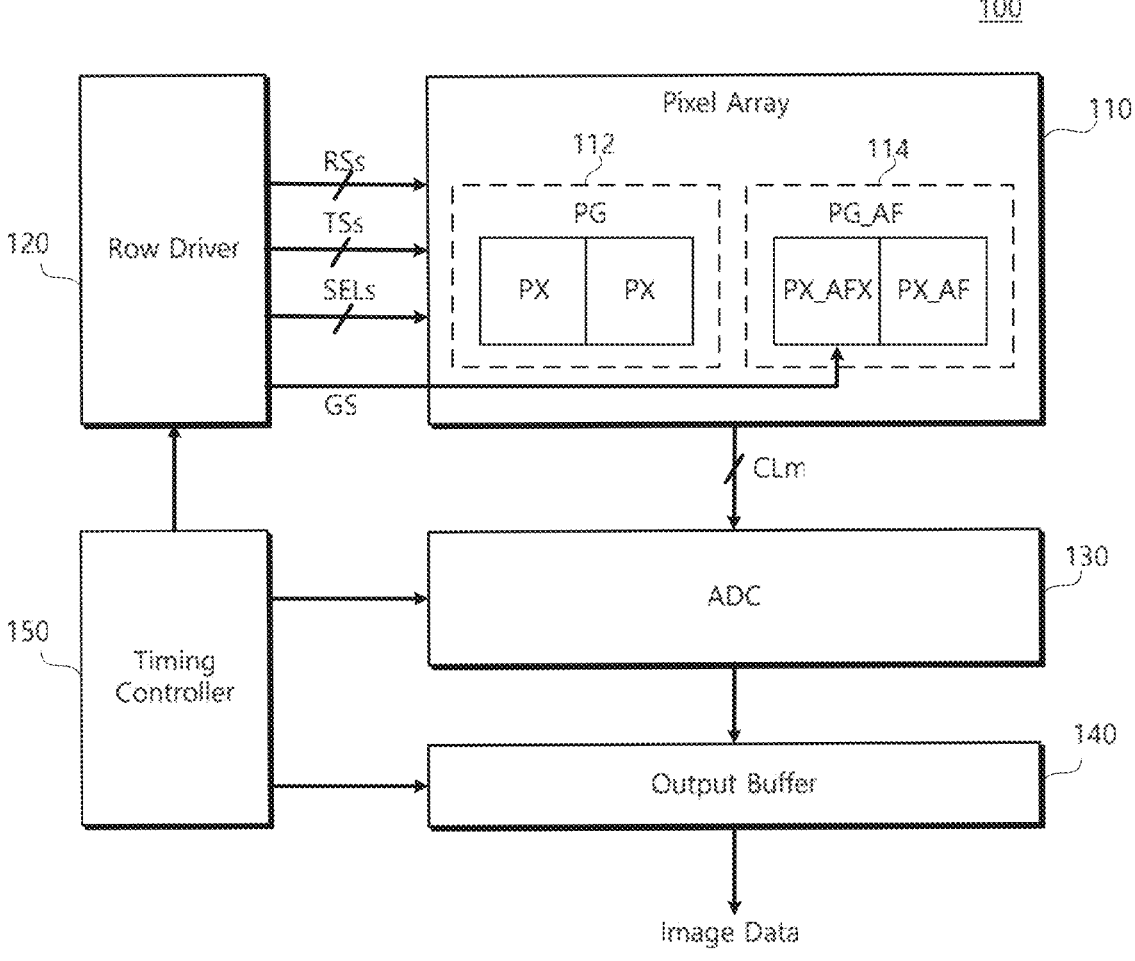
FIG. 1 is a view illustrating an image sensor according to an embodiment of the present disclosure.

FIG. 1 is a view illustrating an image sensor 100 according to an embodiment of the present disclosure.

The image sensor 100 includes at least one AF pixel PX_AF to provide an AF function. In particular, to provide an accurate AF function, the image sensor 100 selectively provides a ground level voltage or a high level voltage to a photo diode of an AF adjacent pixel PX_AFX adjacent to the AF pixel PX_AF. Accordingly, charges generated from the AF adjacent pixel PX_AFX may be prevented from being mixed with charges generated from the AF pixel PX_AF.

Referring to FIG. 1, the image sensor 100 includes a pixel array 110, a row driver 120, an analog-to-digital converter (ADC) 130, an output buffer 140, and a timing controller 150.

The pixel array 110 includes at least one pixel group 112 and at least one AF pixel group 114. The pixel array 110 may receive pixel drive signals, such as a reset signal RS, a transmission signal TS, and a selection signal SEL, from the row driver 120. The pixel array 110 may operate according to control of the received pixel drive signals, and each of the pixel group 112 and the AF pixel group 114 may convert an optical signal into an image signal or a phase signal. The image signal and the phase signal generated by the pixel group 112 and the AF pixel group 114 are provided to the analog-to-digital converter 130 through a plurality of column lines CLm.

Each pixel group 112 includes a plurality of pixels PX. For example, a plurality of pixels PX included in one pixel group 112 may be shared pixels in which a plurality of photo diodes PD share the same floating diffusion region FD.

However, this is an example, and the plurality of pixels PX may include different floating diffusion regions FD. Each pixel PX included in the pixel group 112 generates an image signal for generating image data.

Each AF pixel group 114 includes at least one AF pixel PX_AF and at least one AF adjacent pixel PX_AFX. Here, the AF adjacent pixel PX_AFX may refer to a pixel that shares the same floating diffusion region FD with the AF pixel PX_AF. The AF pixel PX_AF generates a phase signal used to calculate a phase difference for an AF function, in other words, an auto focusing function. The AF adjacent pixel PX_AFX may be deactivated such that it does not generate a signal depending on an operating mode. Alternatively, the AF adjacent pixel PX_AFX may generate an image signal for generating image data, or may generate a phase signal used to calculate a phase difference, depending on operating modes.

In more detail, the AF adjacent pixel PX_AFX receives a ground control signal GS from the row driver 120. The ground control signal GS may be provided to one end of the photo diode in the AF adjacent pixel PX_AFX, and the row driver 120 may control the voltage level of the ground control signal GS such that the ground control signal GS has a ground level or a high level depending on the operating modes.

For example, when the ground control signal GS has the high level, charges generated from the photo diode of the AF adjacent pixel PX_AFX are drained toward the row driver 120. Accordingly, even though a transmission gate is turned on thereafter, the charges generated from the photo diode of the AF adjacent pixel PX_AFX are not transferred to the floating diffusion region FD. In other words, the AF adjacent pixel PX_AFX is deactivated. Since the charges generated from the photo diode of the AF adjacent pixel PX_AFX are not transferred to the floating diffusion region FD, the charges generated from the AF adjacent pixel PX_AFX may be prevented from being mixed with charges generated from the AF pixel PX_AF.

In another example, when the ground control signal GS has the high level, the photo diode of the AF adjacent pixel PX_AFX generates and accumulates charges. When the transmission gate is turned on thereafter, the charges accumulated in the photo diode of the AF adjacent pixel PX_AFX are transferred to the floating diffusion region FD. The charges transferred to the floating diffusion region FD may be used to generate an image signal or a phase signal.

The row driver 120 may select any one row of the pixel array 110 under the control of the timing controller 150. The row driver 120 may generate the selection signal SEL to select one of a plurality of rows. The row driver 120 may activate the reset signal RS and the transmission signal TS in a predetermined sequence for pixels corresponding to the selected row. Furthermore, the row driver 120 may provide a ground control signal GS having a ground level or a high level for an AF adjacent pixel PX_AFX corresponding to the selected row. In one example, the row driver 120 may provide the ground control signal GS with the ground level to the AF adjacent pixel PX_AFX of one selected row while providing the ground control signal GS with the high level to the AF adjacent pixel PX_AFX of another selected row.

The analog-to-digital converter 130 may receive a reset level signal and a sensing signal generated from each pixel in a selected row. Here, the reset level signal may be a signal corresponding to a reference voltage of a floating diffusion region FD, and the sensing signal may be a signal corresponding to a signal voltage of the floating diffusion region FD. The analog-to-digital converter 130 may convert the reset level signal and the sensing signal into digital signals and may output the digital signals. For example, the analog-to-digital converter 130 may sample the reset level signal and the sensing signal by a correlated double sampling method and thereafter may convert the reset level signal and the sensing signal into digital signals. To accomplish this, a correlated double sampler (CDS) may be additionally disposed at a front end of the analog-to-digital converter 130.

The output buffer 140 may latch and output image data provided in units of columns by the analog-to-digital converter 130. The output buffer 140 may temporarily store image data output from the analog-to-digital converter 130 under the control of the timing controller 150 and thereafter may output image data sequentially latched by a column decoder.

The timing controller 150 may control the pixel array 110, the row driver 120, the analog-to-digital converter (ADC) 130, the output buffer 140, and the like. The timing controller 150 may supply control signals, such as a clock signal, a timing control signal, and the like, for operations of the pixel array 110, the row driver 120, the analog-to-digital converter (ADC) 130, the output buffer 140, and the like. The timing controller 150 may include a logic control circuit, a phase lock loop (PLL) circuit, a timing control circuit, and a communication interface circuit.

The configuration of the image sensor 100 according to the embodiment of the present disclosure has been described above in brief. According to the present embodiment, one end of the photo diode of the AF adjacent pixel PX_AFX is connected to the row driver 120, and the row driver 120 provides the ground control signal GS having the ground level or the high level to the one end of the photo diode of the AF adjacent pixel PX_AFX depending on the operating modes. Accordingly, charges generated from the photo diode of the AF adjacent pixel PX_AFX may be prevented from being mixed with charges generated from the AF pixel PX_AF, and thus an accurate AF function may be provided.

Figure 2:
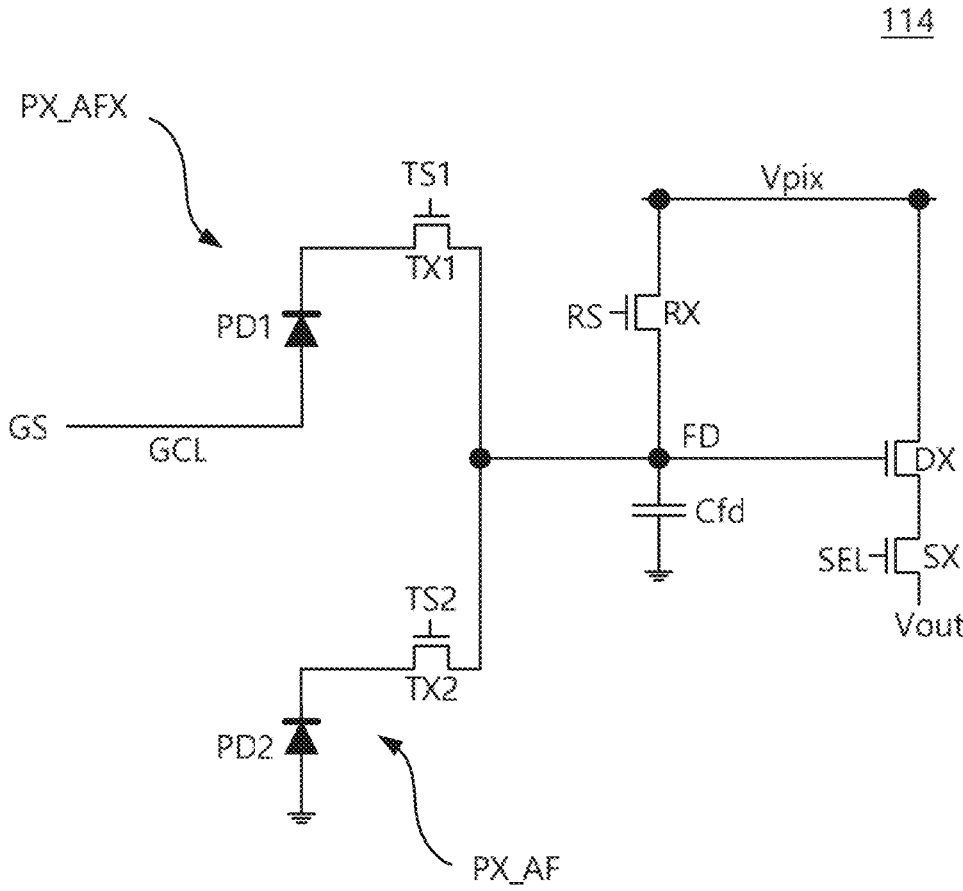
FIG. 2 is a circuit diagram illustrating an example of an auto focusing (AF) pixel group of FIG. 1.
Figure 3A:
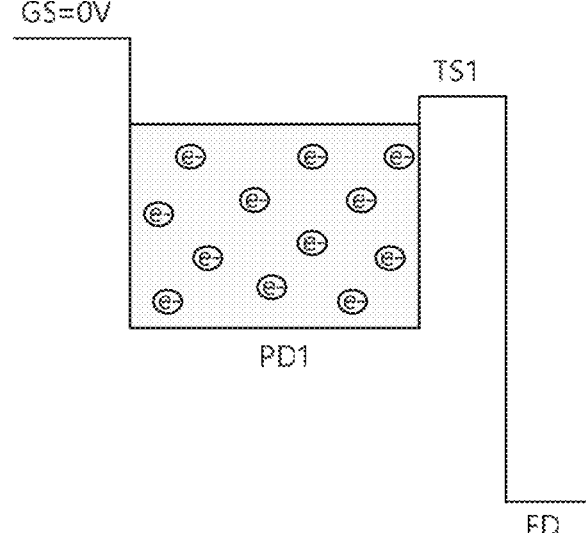
FIGS. 3A and 3B are views for describing activation or deactivation of a photo diode of a pixel adjacent to an AF pixel depending on operating modes.
Figure 3B:
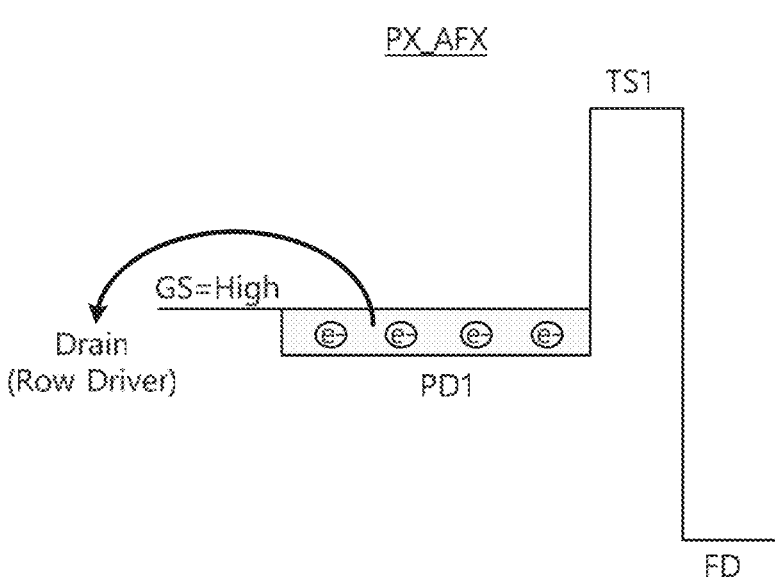

FIG. 2 is a circuit diagram illustrating an example of the AF pixel group 114 of FIG. 1. FIGS. 3A and 3B are views for describing activation or deactivation of the photo diode of the AF adjacent pixel PX_AFX depending on operating modes. For convenience of description, it is assumed in FIG. 2 that the AF pixel group 114 includes one AF adjacent pixel PX_AFX and one AF pixel PX_AF.

Referring to FIG. 2, the AF pixel group 114 includes the AF adjacent pixel PX_AFX and the AF pixel PX_AF that share the floating diffusion region FD. The AF adjacent pixel PX_AFX includes a first photo diode PD1 and a first transmission transistor TX1 and shares the floating diffusion region FD, a reset transistor RX, a drive transistor DX, and a selection transistor SX with the AF pixel PX_AF. The AF pixel PX_AF includes a second photo diode PD2 and a second transmission transistor TX2 and shares the floating diffusion region FD, the reset transistor RX, the drive transistor DX, and the selection transistor SX with the AF adjacent pixel PX_AFX.

The first and second photo diodes PD1 and PD2 are light sensing devices that generate and accumulate charges depending on the amount of incident light or the intensity thereof. At least one of the first and second photo diodes PD1 and PD2 may be implemented with a photo transistor, a photo gate, a pinned photo diode (PPD), an organic photo diode (OPD), a quantum dot (QD), or the like.

One end (e.g., a first end) of the first photo diode PD1 of the AF adjacent pixel PX_AFX is connected to the row driver 120 (refer to FIG. 1) through a ground control line GCL. The row driver 120 may selectively provide a ground control signal GS having a ground level or a ground control signal GS having a high level to the first photo diode PD1 depending on the operating modes.

For example, the AF adjacent pixel PX_AFX and the AF pixel AF_PX may sequentially generate different analog signals. For example, the AF adjacent pixel PX_AFX may generate an image signal, and the AF pixel PX_AF may sequentially generate a phase signal. In this case, the ground control signal GS having the ground level may be provided to the first photo diode PD1 of the AF adjacent pixel PX_AFX, and the first photo diode PD1 may be activated.

Specifically, when the ground control signal GS having the ground level is provided to the first photo diode PD1 of the AF adjacent pixel PX_AFX, the first photo diode PD1 may have a potential level capable of accommodating charges as illustrated in FIG. 3A. Accordingly, charges generated by the first photo diode PD1 may be accumulated in the first photo diode PD1. When the first transmission transistor TX1 is turned on, the charges accumulated in the first photo diode PD1 move to the floating diffusion region FD. Thereafter, an image signal may be generated by sampling the floating diffusion region FD. After that, the floating diffusion region FD may be reset, and a phase signal may be generated by the AF pixel PX_AF in a similar manner.

In another example, while the AF pixel PX_AF generates a phase signal, charges may not be accumulated in the first photo diode PD1 of the AF adjacent pixel PX_AFX. In this case, the ground control signal GS having the high level may be provided to the first photo diode PD1 of the AF adjacent pixel PX_AFX while the AF pixel PX_AF generates the phase signal. Accordingly, the first photo diode PD1 may be deactivated.

Specifically, when the ground control signal GS having the high level is applied as illustrated in FIG. 3B, charges generated from the first photo diode PD1 of the AF adjacent pixel PX_AFX are drained toward the row driver 120 through the ground control line GCL. Accordingly, the charges are not accumulated in the first photo diode PD1. Therefore, even though the first transmission transistor TX1 is turned on thereafter, the charges do not move from the first photo diode PD1 to the floating diffusion region FD. Thus, only charges generated from the AF pixel PX_AF may be used to generate a phase signal so that an accurate phase signal may be generated.

The voltage level of the ground control signal GS may be diversely set. For example, a voltage having a low level or a negative level instead of the ground level may be set as the ground control signal GS. Furthermore, the high level of the ground control signal GS may be appropriately set such that a back-flow phenomenon does not occur from the floating diffusion region FD.

Still referring to FIG. 2, the first and second transmission transistors TX1 and TX2 are turned on or off in response to first and second transmission signals TS1 and TS2 provided from the row driver 120. The first and second transmission transistors TX1 and TX2 may transmit charges accumulated in the first and second photo diodes PD1 and PD2 to the floating diffusion region FD.

One end (e.g., a first end) of the floating diffusion region FD may be connected to drains of the first and second transmission transistors TX1 and TX2, and an opposite end (e.g., a second end) of the floating diffusion region FD may be connected to a gate of the drive transistor DX that is driven as a source follower amplifier. The floating diffusion region FD may operate as a floating diffusion region transistor Cfd and may store charges generated from the first photo diode PD1 or the second photo diode PD2 in the floating diffusion region transistor Cfd.

The reset transistor RX may reset the floating diffusion region FD in response to a reset signal RS. For example, a source of the reset transistor RX may be connected to the floating diffusion region FD. When the reset signal RS is activated, the reset transistor RX is turned on, and a power voltage Vpix is transferred to the floating diffusion region FD. In this case, the charges accumulated in the floating diffusion region transistor Cfd may be drained to a power voltage (Vpix) terminal, and the voltage level of the floating diffusion region FD may be reset to the power voltage Vpix.

The gate of the drive transistor DX may be connected to the floating diffusion region FD and may serve as a source follower amplifier. For example, the drive transistor DX may amplify a potential change of the floating diffusion region FD and may transfer the amplified potential change to a column line CLi via the selection transistor SX.

The selection transistor SX is used to select pixels or a pixel group to be read in units of rows. The selection transistor SX may be driven by a selection signal SEL provided in units of rows. When the selection transistor SX is turned on, the potential of the floating diffusion region FD may be amplified and transferred to a drain of the selection transistor SX through the drive transistor DX.

As described above, the AF pixel group 114 according to the embodiment of the present disclosure includes at least one AF pixel PX_AF and at least one AF adjacent pixel PX_AFX that share the floating diffusion region FD. Furthermore, the ground control signal GS having the ground level or the high level may be selectively provided to the photo diode of the AF adjacent pixel PX_AFX depending on the operating modes. Accordingly, charges generated from the AF adjacent pixel PX_AFX and charges generated from the AF pixel PX_AF may be separated without being mixed with each other, and thus an accurate AF function may be provided.

For convenience of description, it has been described in FIGS. 2 and 3 that the AF pixel group 114 includes one AF adjacent pixel PX_AFX and one AF pixel PX_AF. However, this is an example, and the present disclosure is not limited thereto. For example, the AF pixel group 114 may be implemented to include two or more AF adjacent pixels PX_AFX or two or more AF pixels PX_AF. In addition, the ratio and arrangement of the pixel group 112 and the AF pixel group 114 included in the pixel array 110 and the connection relationship and operating modes of the row driver 120 and the pixel array 110 may be diversely modified and applied. Hereinafter, various modifications and applications of the present disclosure will be described in more detail.

[Image Sensor Including Sparse AF Pixel Array]

Figure 4:
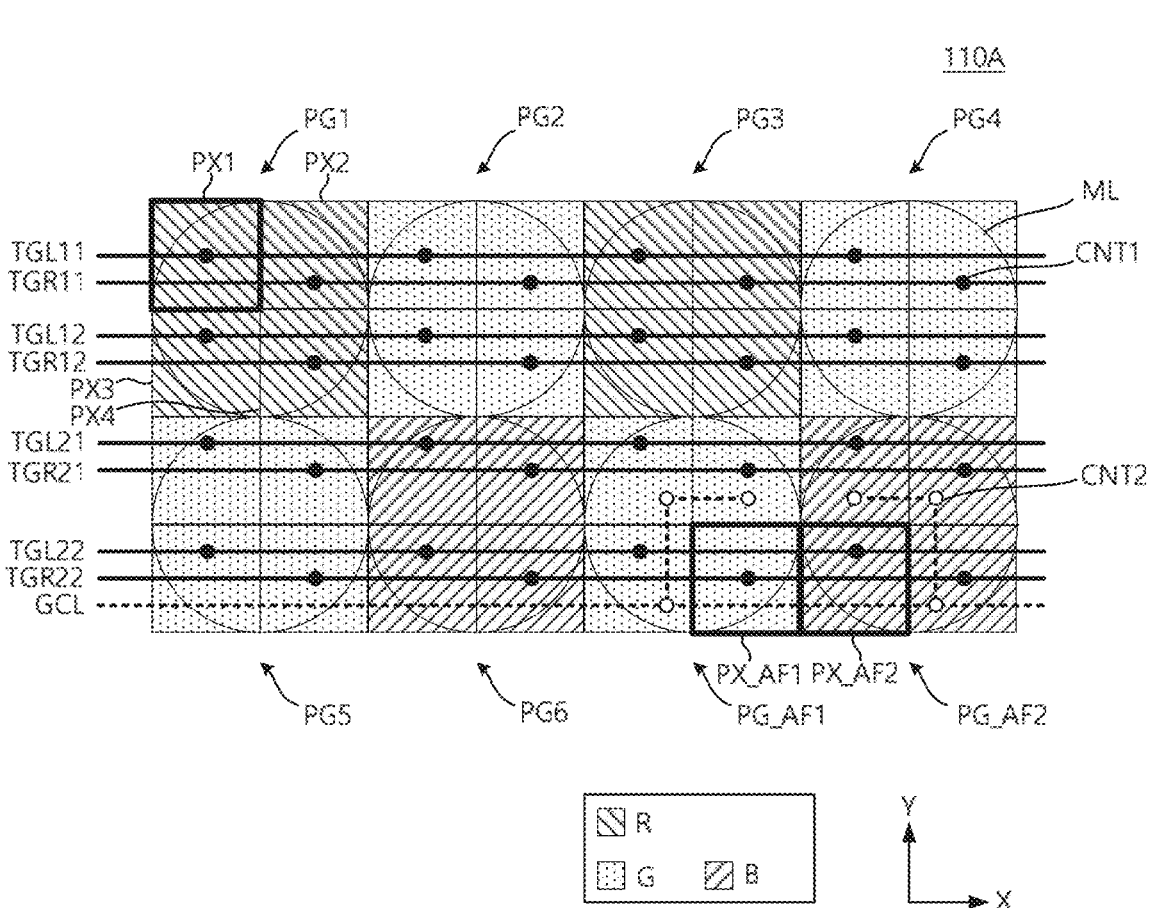
FIG. 4 is a view illustrating an example of a connection relationship between a pixel array and a row driver according to an embodiment of the present disclosure.
Figure 5:
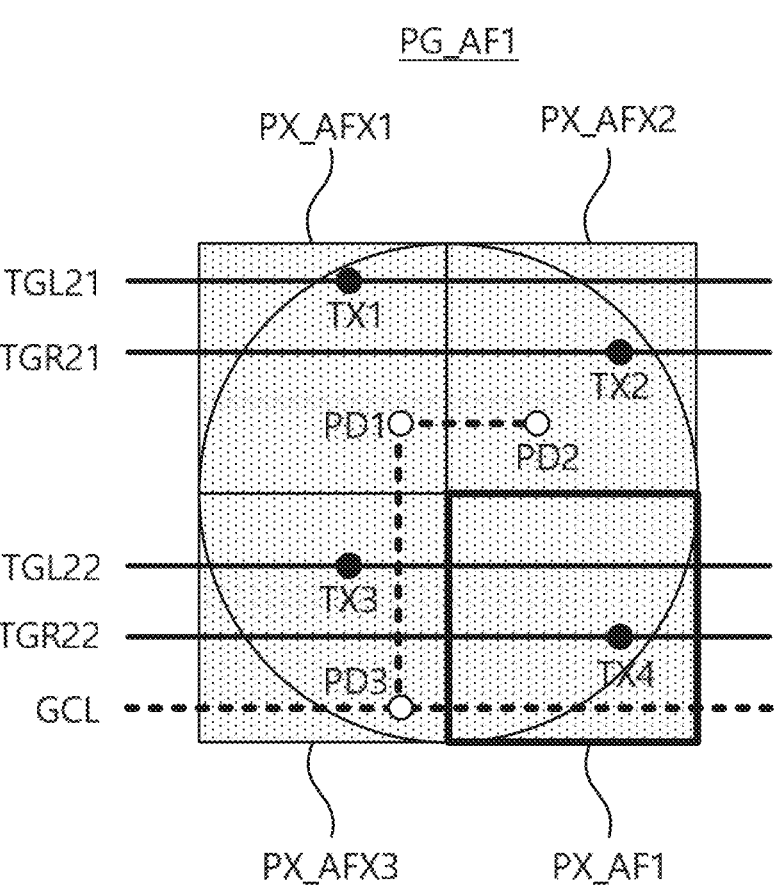
FIG. 5 is a detailed view illustrating a connection relationship between a first AF pixel group of the pixel array of FIG. 4 and the row driver.

FIG. 4 is a view illustrating a connection relationship between a pixel array 110A and the row driver 120 according to an embodiment of the present disclosure. FIG. 5 is a detailed view illustrating a connection relationship between a first AF pixel group PG_AF1 of the pixel array 110A of FIG. 4 and the row driver 120.

For convenience of description, it is illustrated in FIGS. 4 and 5 that each pixel group includes four pixels. Furthermore, a connection relationship between each of transmission gate lines TGL11, TGR11, TGL12, TGR12, TGL21, TGR21, TGL22, and TGR22 and the pixel array 110A is displayed through a first connection CNT1, and a connection relationship between a ground control line GCL and a photo diode is displayed through a second connection CNT2.

Referring to FIG. 4, the pixel array 110A includes a plurality of pixel groups PG1, PG2, PG3, PG4, PG5 and PG6 and a plurality of AF pixel groups PG_AF1 and PG_AF2. Each of the plurality of pixel groups PG1 to PG6 includes four pixels PXs disposed in a first direction (an X direction) and a second direction (a Y direction), and the four pixels PXs share one micro lens ML. Similarly, each of the plurality of AF pixel groups PG_AF1 and PG_AF2 includes four AF pixels PX_AFs disposed in the first direction (the X direction) and the second direction (the Y direction), and the four AF pixels PX_AFs share one micro lens ML.

The plurality of pixel groups PG1 to PG6 and the plurality of AF pixel groups PG_AF1 and PG_AF2 may be disposed in the pixel array 110A to correspond to a Bayer pattern. For example, the first and third pixel groups PG1 and PG3 may include a red (R) color filter, the second, fourth, and fifth pixel groups PX2, PX4, and PX5 and the first AF pixel group PG_AF1 may include a green (G) color filter, and the sixth pixel group PG6 and the second AF pixel group PG_AF2 may include a blue (B) color filter. However, this is an example, and the pixel array 110A may include various types of color filters. For example, the color filters may include filters for sensing yellow, cyan, and magenta colors. Alternatively, the color filters may include filters for sensing a white color.

The pixels included in the plurality of pixel groups PG1 to PG6 are connected to corresponding lines among the transmission gate lines TGL11, TGR11, TGL12, TGR12, TGL21, TGR21, TGL22, and TGR22. For example, first pixels PX1 included in the first to fourth pixel groups PG1 to PG4 may be connected to the first transmission gate line TGL11, second pixels PX2 included in the first to fourth pixel groups PG1 to PG4 may be connected to the second transmission gate line TGR11, third pixels PX3 included in the first to fourth pixel groups PG1 to PG4 may be connected to the third transmission gate line TGL12, and fourth pixels PX4 included in the first to fourth pixel groups PG1 to PG4 may be connected to the fourth transmission gate line TGR12. Similarly, first, second, third and fourth pixels PX1, PX2, PX3 and PX4 included in the fifth and sixth pixel groups PG5 and PG6 may be connected to the fifth, sixth, seventh and eighth transmission gate lines TGL21, TGR21, TGL22, and TGR22.

AF pixels and AF adjacent pixels included in the plurality of AF pixel groups PG_AF1 and PG_AF2 are connected to corresponding lines among the transmission gate lines TGL11, TGR11, TGL12, TGR12, TGL21, TGR21, TGL22, and TGR22. In addition, the AF adjacent pixels included in the plurality of AF pixel groups PG_AF1 and PG_AF2 are connected to the ground control line GCL.

In more detail, referring to FIG. 5, the first AF pixel group PG_AF1 includes first, second and third AF adjacent pixels PX_AFX1, PX_AFX2 and PX_AFX3 and a first AF pixel PX_AF1. Transmission gates TX1, TX2 and TX3 of the first to third AF adjacent pixels PX_AFX1 to PX_AFX3 may be connected to the fifth to seventh transmission gate lines TGL21, TGR21, and TGL22. A transmission gate TX4 of the first AF pixel PX_AF1 may be connected to the eighth transmission gate line TGR22.

In addition, ends of photo diodes PD1, PD2 and PD3 included in the first to third AF adjacent pixels PX_AFX1 to PX_AFX3 are commonly connected to the ground control line GCL. A ground level voltage or a high level voltage may be selectively provided through the ground control line GCL connected to the photo diodes PD1 to PD3 included in the first to third AF adjacent pixels PX_AFX1 to PX_AFX3.

Figure 6:
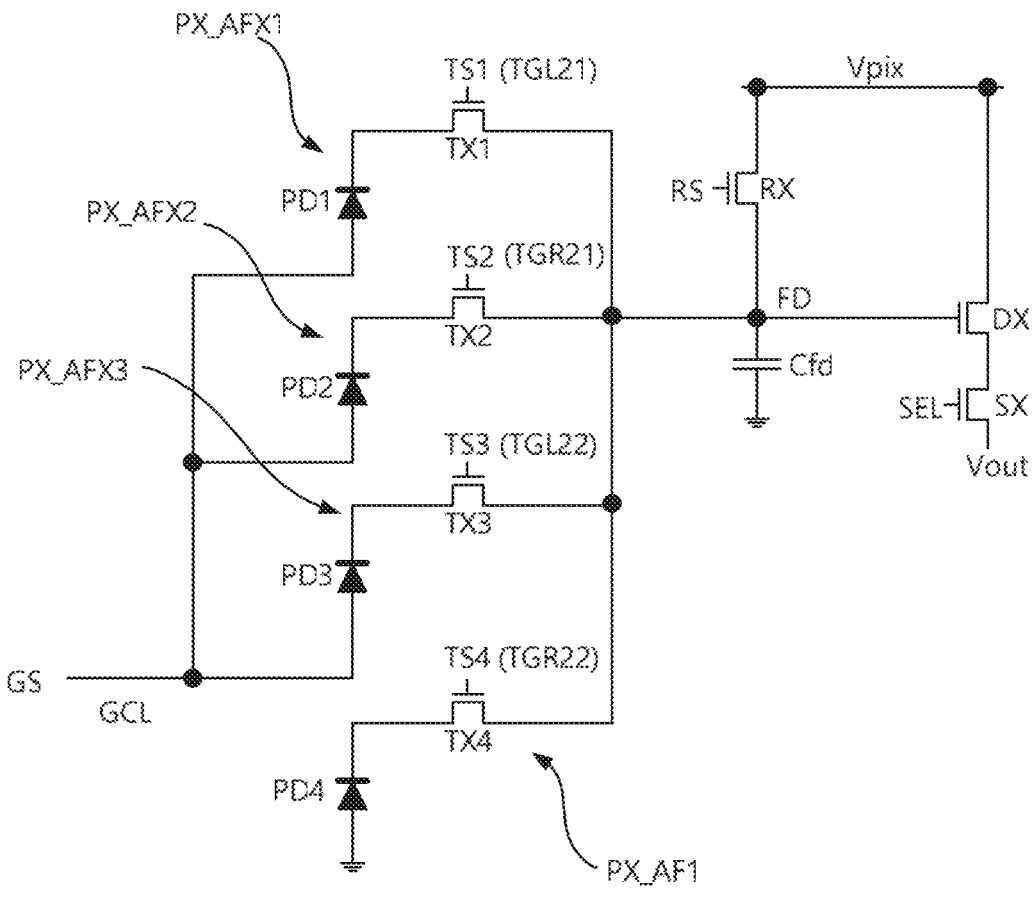
FIG. 6 is a circuit diagram illustrating an example of the first AF pixel group of FIG. 5.

FIG. 6 is a circuit diagram illustrating an example of the first AF pixel group PG_AF1 of FIG. 5. The first AF pixel group PG_AF1 of FIG. 6 is similar to the AF pixel group 114 of FIG. 2. Accordingly, repetitive descriptions will hereinafter be omitted for the sake of brevity.

Referring to FIG. 6, the first to third AF adjacent pixels PX_AFX1 to PX_AFX3 and the first AF pixel PX_AF1 share one floating diffusion region FD. The ends of the photo diodes PD1 to PD3 included in the first to third AF adjacent pixels PX_AFX1 to PX_AFX3 are commonly connected to the ground control line GCL. The row driver 120 (refer to FIG. 1) provides a ground control signal GS having a ground level or a high level to the ends of the photo diodes PD1 to PD3 through the ground control line GCL. An end of a photo diode PD4 included in the first AF pixel PX_AF1 is connected to a ground GND.

Figure 7:
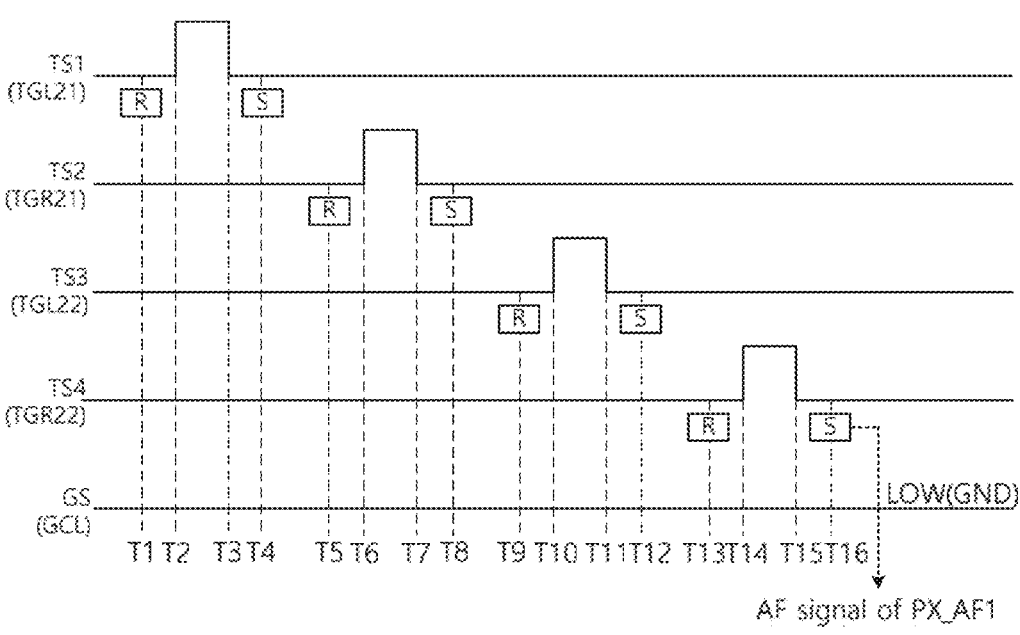
FIG. 7 is a timing chart for describing an operation of the first AF pixel group of FIGS. 5 and 6 in a first mode.

FIG. 7 is a timing chart for describing an operation of the first AF pixel group PG_AF1 of FIGS. 5 and 6 in a full mode.

In the full mode, the first to third AF adjacent pixels PX_AFX1 to PX_AFX3 and the first AF pixel PX_AF1 may sequentially generate an image signal and/or a phase signal. For example, the first to third AF adjacent pixels PX_AFX1 to PX_AFX3 may generate an image signal, and the first AF pixel PX_AF1 may generate a phase signal.

First, while an operation is performed in the full mode, a ground control signal GS having a ground level GND or a low level LOW is provided through the ground control line GCL. Accordingly, the photo diodes PD1, to PD3 of the first to third AF adjacent pixels PX_AFX1 to PX_AFX3 may be activated, and generated charges may be accumulated in the photo diodes PD1 to PD3.

At time T1, a reset transistor RX is turned on, and the floating diffusion region FD is reset. The voltage level of the reset floating diffusion region FD is sampled and used as a reference voltage for the first AF adjacent pixel PX_AFX1.

At time T2, a first transmission signal TS1 having a high level is provided through the fifth transmission gate line TGL21. Accordingly, the transmission transistor TX1 of the first AF adjacent pixel PX_AFX1 is turned on, and the charges accumulated in the photo diode PD1 move to the floating diffusion region FD. The charges moved to floating diffusion region FD are stored in a floating diffusion region transistor Cfd.

At time T3, the transmission transistor TX1 is turned off, and at time T4, the voltage level of the floating diffusion region FD is sampled. The sampled voltage level of the floating diffusion region FD is used as a signal voltage for the first AF adjacent pixel PX_AFX1. By comparing the signal voltage sampled at time T4 with the reference voltage sampled at time T1, a digital code corresponding to an image signal may be output.

Thereafter, at time T5 to T12, operations of generating image signals by the second and third AF adjacent pixels PX_AFX2 and PX_AFX3 may be sequentially performed in a manner similar to the image signal generation operation of the first AF adjacent pixel PX_AFX1. For example, at time T6, a second transmission signal TS2 having a high level is provided through the sixth transmission gate line TGR21. Accordingly, the transmission transistor TX2 of the second AF adjacent pixel PX_AFX22 is turned on, and the charges accumulated in the photo diode PD2 move to the floating diffusion region FD. After that, at time T13 to T16, an operation of generating a phase signal by the first AF pixel PX_AF1 may be performed in a similar manner.

As described above, in the full mode, the first to third AF adjacent pixels PX_AFX1 to PX_AFX3 and the first AF pixel PX_AF1 may sequentially generate the image signals and the phase signal. Accordingly, a high-quality image may be obtained, and an accurate AF function may be provided.

Figure 8:
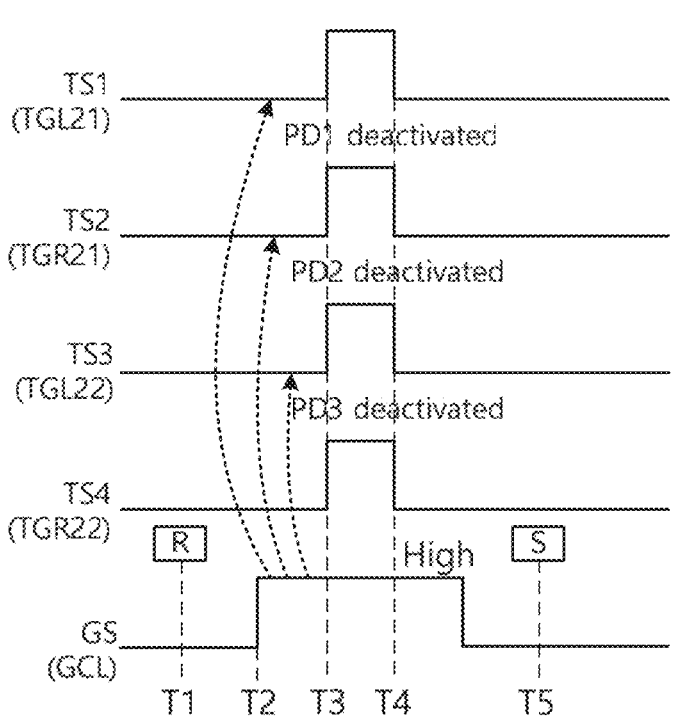
FIG. 8 is a timing chart for describing an operation of the first AF pixel group of FIGS. 5 and 6 in a second mode.

FIG. 8 is a timing chart for describing an operation of the first AF pixel group PG_AF1 of FIGS. 5 and 6 in a binning mode.

In the binning mode, four pixels belonging to each pixel group may generate only one signal. For example, each of the AF pixel groups PG_AF1 and PG_AF2 of the pixel array 110A of FIG. 4 may generate only one phase signal, and each of the pixel groups PG1 to PG6 may generate only one image signal. In particular, even in the binning mode, the first AF pixel group PG_AF1 according to an embodiment of the present disclosure may separate charges generated from the photo diodes of the AF adjacent pixels PX_AFX1 to PX_AFX3 from charges generated from the photo diode of the first AF pixel PX_AF1.

First, at time T1, the voltage level of the floating diffusion region FD is reset. The reset voltage level of the floating diffusion region FD is used as a reference voltage for the first AF pixel PX_AF1.

At time T2, a ground control signal GS having a high level is provided to the photo diodes PD1 to PD3 of the first to third AF adjacent pixels PX_AFX1 to PX_AFX3 through the ground control line GCL. Accordingly, as described above with reference to FIG. 3B, the charges generated from the photo diodes PD1 to PD3 are drained to the row driver 120 (refer to FIG. 1), and charges are not accumulated in the photo diodes PD1 to PD3. In other words, the photo diodes PD1 to PD3 are deactivated.

At time T3, first, second, third and fourth transmission signals TS1, TS2, TS3 and TS4 having a high level are provided, and the transmission transistors TX1, TX2 and TX3 of the first to third AF adjacent pixels PX_AFX1 to PX_AFX3 and the transmission transistor TX4 of the first AF pixel PX_AF1 are all turned on. At this time, only the charges generated from the photo diode PD4 of the first AF pixel PX_AF1 move to the floating diffusion region FD since charges are not accumulated in the photo diodes PD1 to PD3.

Thereafter, at time T4, all of the transmission transistors TX1 to TX4 are turned off, and at time T5, the voltage level of the floating diffusion region FD is sampled. The sampled voltage level of the floating diffusion region FD is used as a signal voltage for the first AF adjacent pixel PX_AFX1. By comparing the signal voltage sampled at time T4 with the reference voltage sampled at time T1, a digital code corresponding to a phase signal may be output.

As described above, in the binning mode, the AF pixel group according to the embodiment of the present disclosure may generate an accurate phase signal by deactivating the photo diodes of the AF adjacent pixels.

Figure 9:
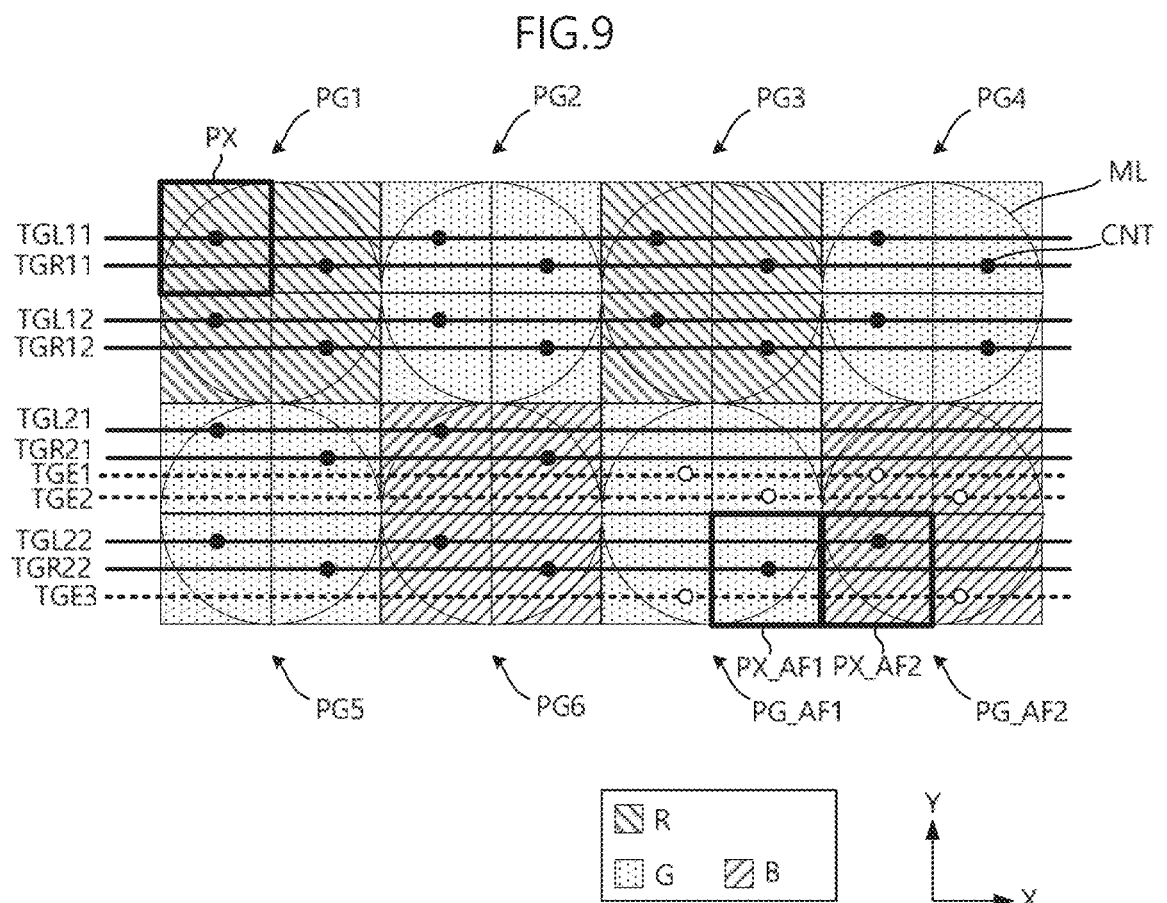
FIG. 9 is a view illustrating an example of a connection relationship between a pixel array and the row driver according to another embodiment of the present disclosure.

FIG. 9 is a view illustrating an example of a connection relationship between a pixel array and the row driver according to another embodiment of the present disclosure. For convenience of description, it is assumed that similarly to that in FIG. 4, the pixel array includes first to sixth pixel groups PG1 to PG6 and first and second AF pixel groups PG_AF1 and PG_AF2 and each pixel group includes four pixels.

To prevent charges generated from photo diodes of AF adjacent pixels from being mixed with charges generated from an AF pixel, the pixel array of FIG. 9 further includes lines for separately controlling transmission gates of the AF adjacent pixels. For example, to separately control transmission gates of first to third AF adjacent pixels of the first AF pixel group PG_AF1, the pixel array of FIG. 9 further includes three transmission gate mode control lines TGE1, TGE2 and TGE3.

Furthermore, in the case of the pixel array of FIG. 9, a larger number of lines are additionally required as the number of AF pixel groups is increased. For example, when the third pixel group PG3 is an AF pixel group, three transmission gate mode control lines have to be additionally provided. Due to this, in the case of the pixel array of FIG. 9, the arrangement of lines is complicated, and the gap between the lines is narrowed. Therefore, coupling noise is generated.

In contrast, the pixel array according to the embodiment of the present disclosure additionally requires only one ground control line GCL to prevent charges generated from the photo diodes of the AF adjacent pixels from being mixed with charges generated from the AF pixel. For example, the first and second AF pixel groups PG_AF1 and PG_AF2 of FIG. 4 may provide a high level voltage to the photo diodes of the AF adjacent pixels through the one ground control line GCL and may deactivate the photo diodes of the AF adjacent pixels accordingly. Thus, the pixel array according to the embodiment of the present disclosure may provide an accurate AF function while minimizing an arrangement of additional lines.

It has been described in FIGS. 4 to 8 that the first AF pixel PX_AF1 and the second AF pixel PX_AF2 are disposed in the first direction (the X direction) and the image sensor calculates a phase difference in the first direction. However, this is an example. The first AF pixel PX_AF1 and the second AF pixel PX_AF2 may be disposed in the second direction (the Y direction), and a phase difference in the second direction may be calculated.

In addition, it has been described in FIGS. 4 to 8 that each pixel group of the pixel array 110A includes four pixels. However, this is an example, and the structure and arrangement of the pixel array may be diversely modified. Hereinafter, pixel arrays according to other embodiments of the present disclosure will be described in more detail.

Figure 10:
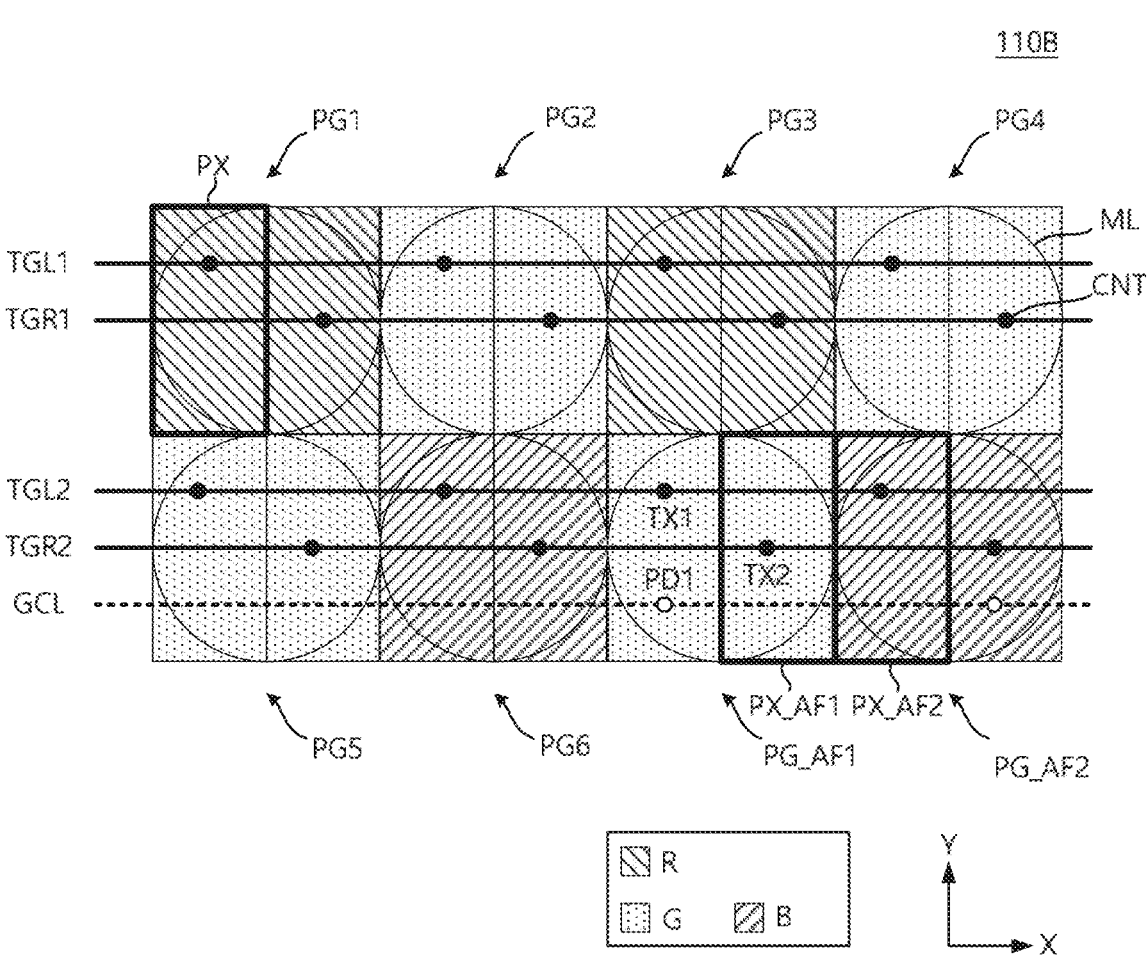
FIG. 10 is a view illustrating an example of a connection relationship between a pixel array and the row driver according to an embodiment of the present disclosure.
Figure 11:
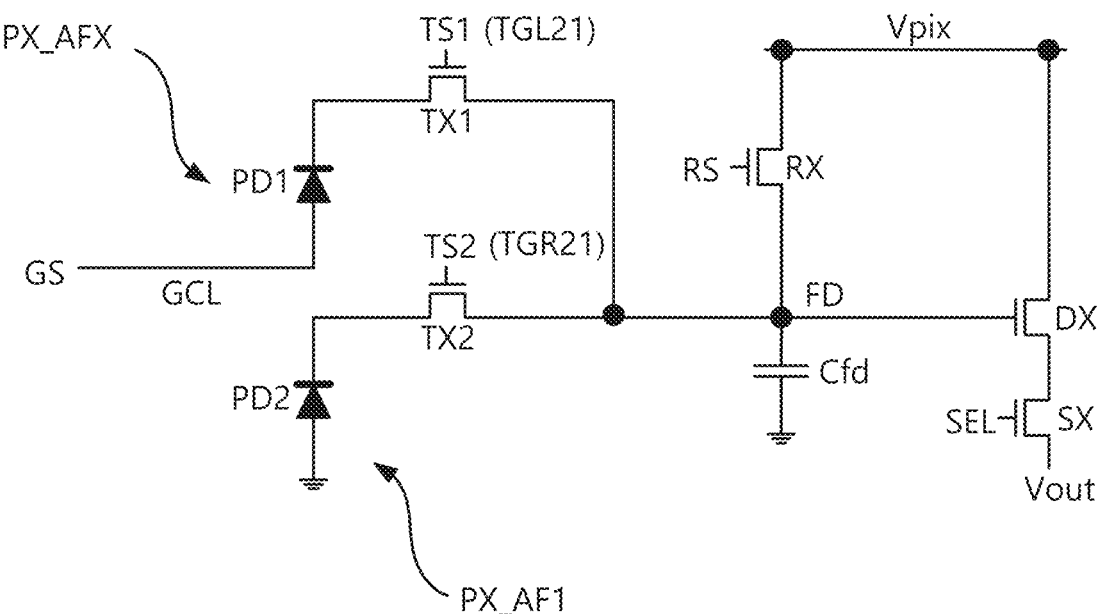
FIG. 11 is a circuit diagram illustrating an example of a first AF pixel group of FIG. 10.

FIG. 10 is a view illustrating a connection relationship between a pixel array 110B and the row driver 120 according to an embodiment of the present disclosure, and FIG. 11 is a circuit diagram illustrating an example of a first AF pixel group PG_AF1 of FIG. 10. The pixel array 110B of FIG. 10 and the first AF pixel group PG_AF1 of FIG. 11 are similar to the pixel array 110A of FIG. 4 and the first AF pixel group PG_AF1 of FIG. 6. Accordingly, identical or similar components will be assigned with identical or similar reference numerals, and repetitive descriptions will hereinafter be omitted.

The pixel groups and the AF pixel groups of the pixel array 110A of FIG. 4 each include four pixels disposed in the first and second directions, whereas pixel groups and AF pixel groups of the pixel array 1101B of FIG. 10 each include two pixels disposed in the first direction. Accordingly, as illustrated in FIG. 10, two gate transmission lines (e.g., TGL1 and TGR1) correspond to each of a plurality of pixel groups PG1 to PG6, and two gate transmission lines (e.g., TGL2 and TGR2) and one ground control line GCL correspond to each of a plurality of AF pixel groups PG_AF1 and PG_AF2.

In more detail, referring to FIG. 11, the first AF pixel group PG_AF1 includes an AF adjacent pixel PX_AFX and a first AF pixel PX_AF1 that share a floating diffusion region FD. An end (e.g., a first end) of a photo diode PD1 included in the AF adjacent pixel PX_AFX may be connected to a ground control line GCL, and the row driver 120 may provide a ground control signal GS having a ground level or a high level to the photo diode PD1 through the ground control line GCL. Accordingly, charges generated from the AF adjacent pixel PX_AFX and charges generated from the first AF pixel PX_AF1 may be separated without being mixed with each other, and thus an accurate AF function may be provided.

Figure 12:
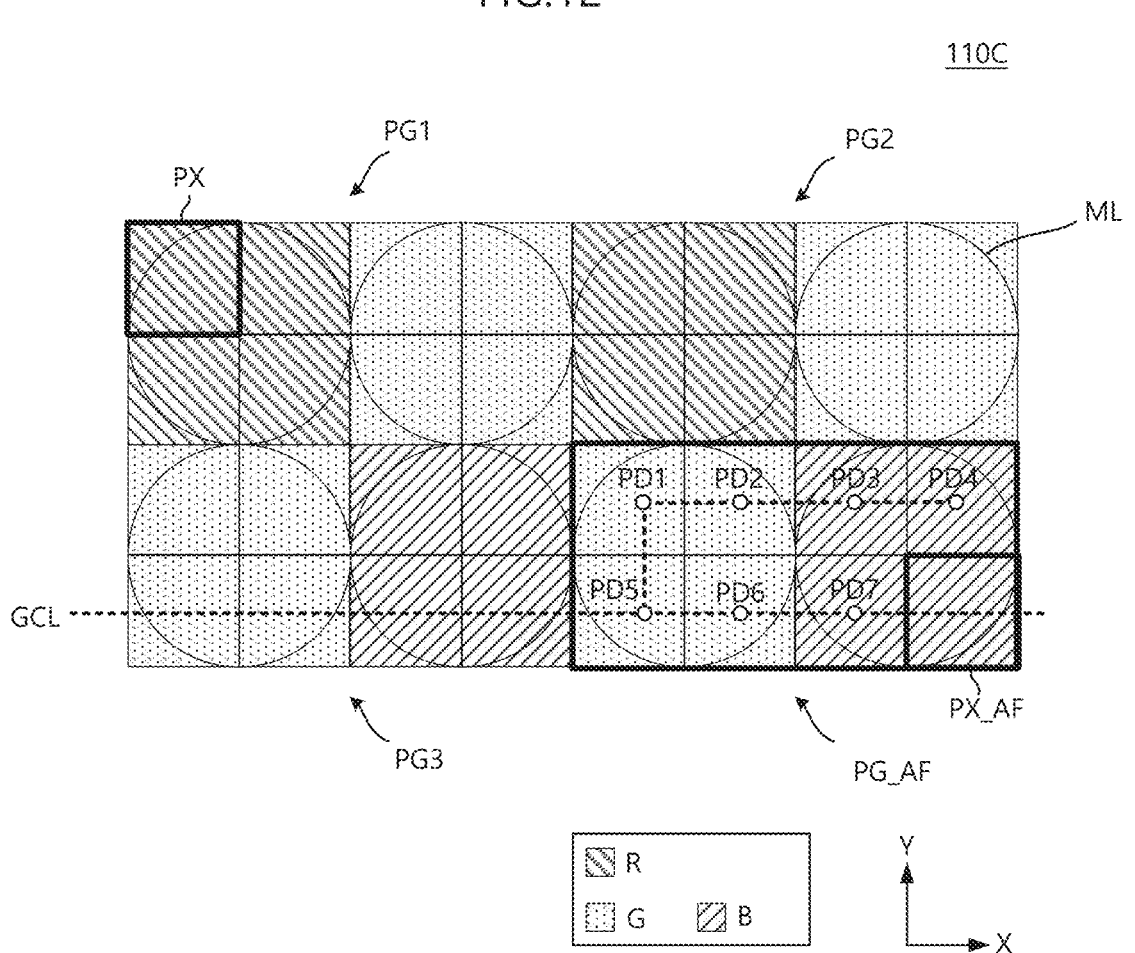
FIG. 12 is a view illustrating an example of a connection relationship between a pixel array and the row driver according to an embodiment of the present disclosure.
Figure 13:
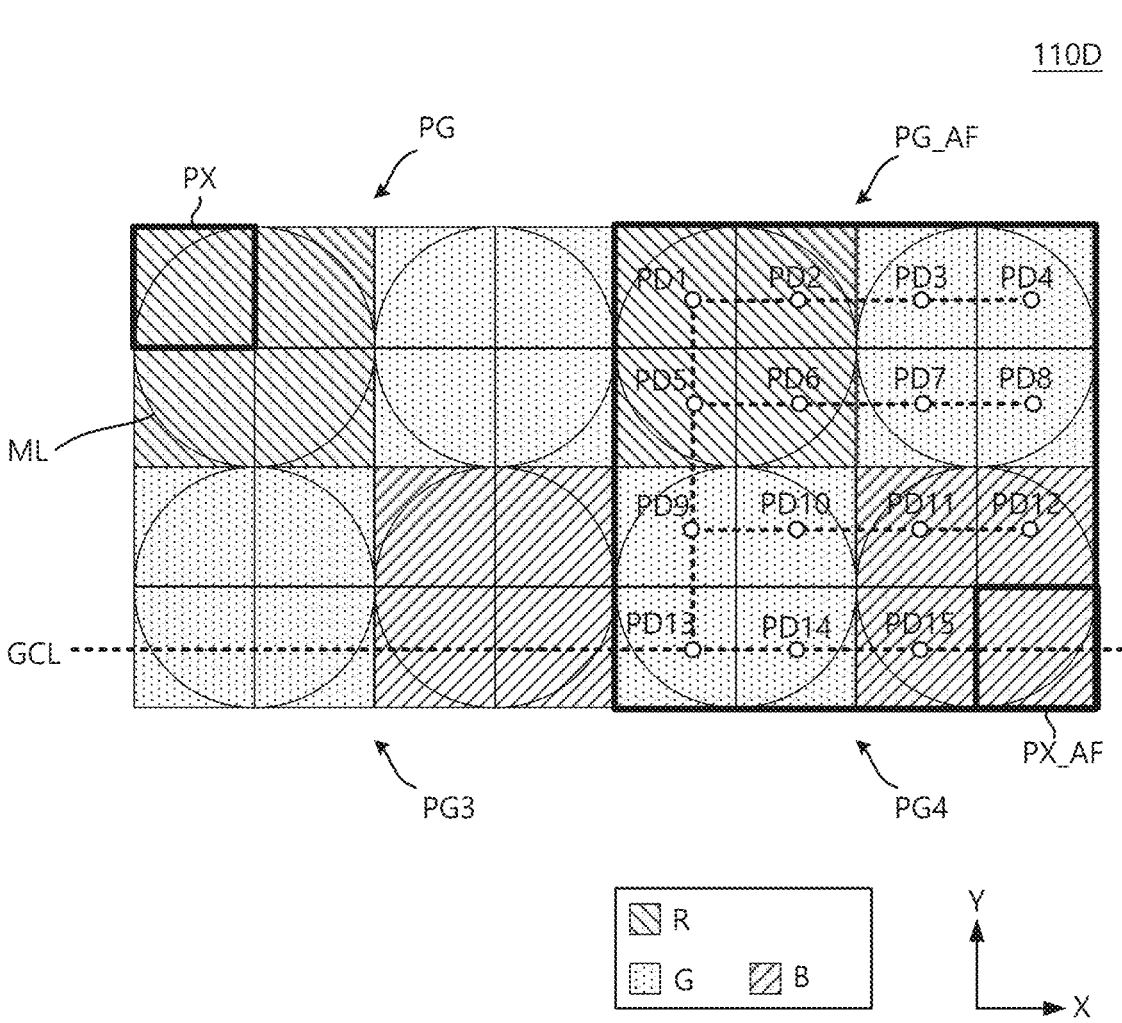
FIG. 13 is a view illustrating an example of a connection relationship between a pixel array and the row driver according to an embodiment of the present disclosure.

FIG. 12 is a view illustrating a connection relationship between a pixel array 110C and the row driver 120 according to an embodiment of the present disclosure, and FIG. 13 is a view illustrating a connection relationship between a pixel array 110D and the row driver 120 according to an embodiment of the present disclosure. The pixel arrays 110C and 110D of FIGS. 12 and 13 are similar to the pixel arrays 110A and 110B of FIGS. 4 and 10. Accordingly, identical or similar components will be assigned with identical or similar reference numerals, and repetitive descriptions will hereinafter be omitted.

Referring to FIG. 12, the pixel array 110C may include a plurality of pixel groups PG1 to PG3 and an AF pixel group PG_AF, and the plurality of pixel groups PG1 to PG3 and the AF pixel group PG_AF may each include eight pixels. When viewed on a plane, four left pixels of each pixel group may share one micro lens ML, and four right pixels of the pixel group may share another micro lens ML. However, this is an example, and the eight pixels may share one micro lens ML.

The AF pixel group PG_AF may include one AF pixel and seven AF adjacent pixels that share a floating diffusion region. Ends of photo diodes PD1, PD2, PD3, PD4, PD5, PD6 and PD7 included in the seven AF adjacent pixels may be connected to a ground control line GCL, and the row driver 120 may selectively provide a ground control signal GS having a ground level or a high level through the ground control line GCL.

Referring to FIG. 13, the pixel array 110D may include a pixel group PG and an AF pixel group PG_AF, and the pixel group PG and the AF pixel group PG_AF may each include sixteen pixels. When viewed on a plane, four pixels of each pixel group may share one micro lens ML. However, this is an example, and the sixteen pixels may share one micro lens ML.

The AF pixel group PG_AF may include one AF pixel and fifteen AF adjacent pixels that share a floating diffusion region. Ends of photo diodes PD1, PD2, PD3, PD4, PD5, PD6, PD7, PD8, PD9, PD10, PD11, PD12, PD13, PD14 and PD15 included in the fifteen AF adjacent pixels may be connected to a ground control line GCL, and the row driver 120 may selectively provide a ground control signal GS having a ground level or a high level through the ground control line GCL.

As described above, the numbers of AF pixels and AF adjacent pixels included in the AF pixel groups according to the embodiments of the present disclosure may be diversely implemented. By selectively providing a ground level voltage or a high level voltage to the ends of the photo diodes included in the AF adjacent pixels through the ground control line GCL, the pixel arrays according to the embodiments of the present disclosure may separate charges generated from the AF adjacent pixels from charges generated from the AF pixel.

[Image Sensor for Supporting Transition from All Pixel AF Mode to Sparse AF Mode]

Figure 14:
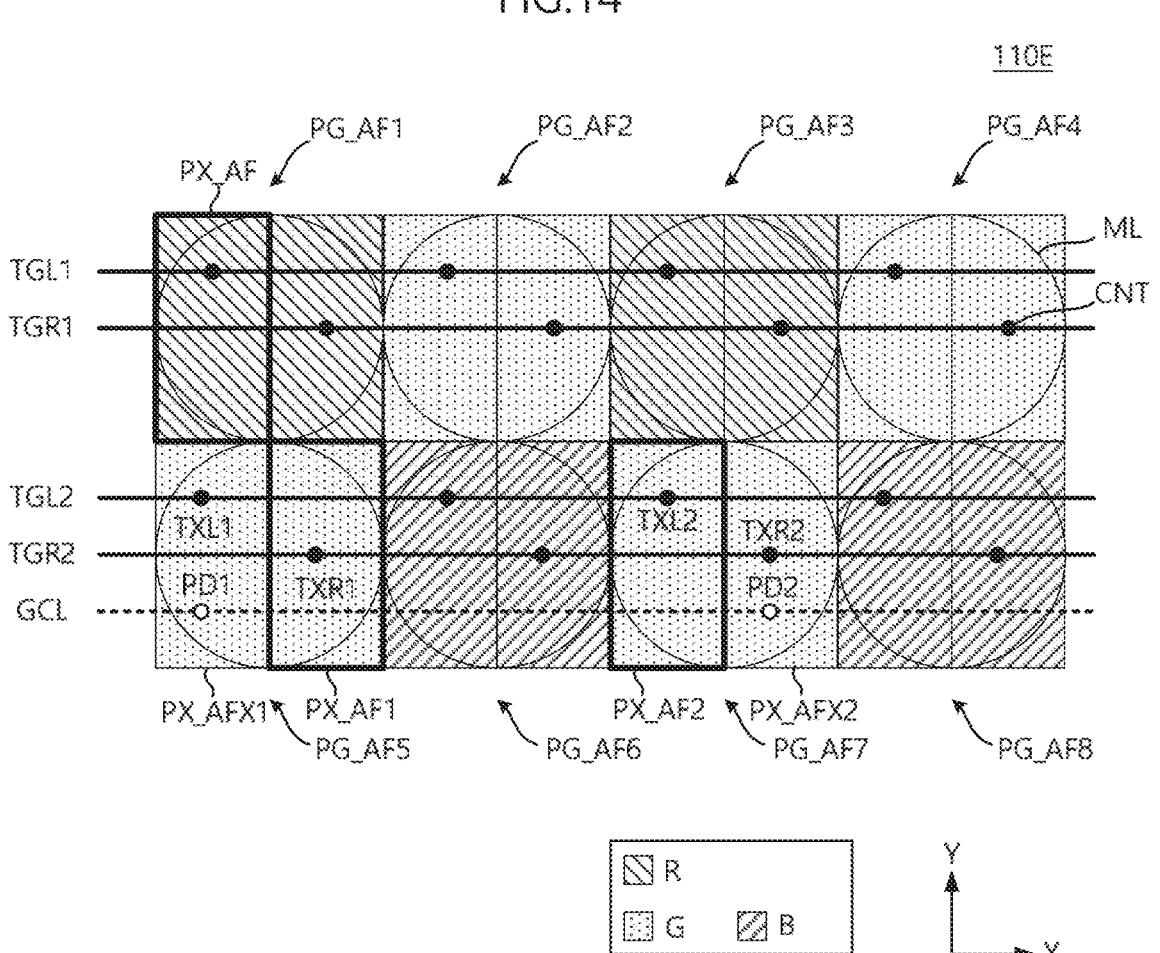
FIG. 14 is a view illustrating an example of a connection relationship between a pixel array and the row driver according to an embodiment of the present disclosure.

FIG. 14 is a view illustrating a connection relationship between a pixel array 110E and the row driver 120 according to an embodiment of the present disclosure. For convenience of description, it is assumed in FIG. 14 that each AF pixel group includes two AF pixels.

Referring to FIG. 14, the pixel array 110E includes a plurality of AF pixel groups PG_AF1, PG_AF2, PG_AF3, PG_AF4, PG_AF5, PG_AF6, PG_AF7 and PG_AF8. In other words, compared to the pixel arrays 110A to 110D described with reference to FIGS. 4 to 13 in which AF pixels are partially disposed between normal pixels, the pixel array 110E of FIG. 14 includes only a plurality of AF pixels. Since all of the pixels disposed in the pixel array 110E are AF pixels, the pixel array 110E of FIG. 14 may be referred to as an all pixel AF array. For example, a partial region of the pixel array 110 (refer to FIG. 1) of the image sensor 100 (refer to FIG. 1) may be implemented with an all pixel AF array such as that illustrated in FIG. 14.

In an embodiment of the present disclosure, the image sensor 100 may be switched from an all pixel AF mode to a sparse AF mode depending on an operating mode. Here, the all pixel AF mode refers to a mode in which each of the AF pixels included in the pixel array 110E generates a phase signal. The all pixel AF mode may be performed when an accurate AF function is required, for example, when an image is taken in a dark place. The sparse AF mode refers to a mode in which only some AF pixels selected from the AF pixels included in the pixel array 110E generate a phase signal. The sparse AF mode may be performed when a rapid AF function is required, for example, when a moving image is taken.

A ground control line GCL is connected to pixels adjacent to AF pixels operating in the sparse AF mode. For example, it is assumed that, as illustrated in FIG. 14, the fifth AF pixel group PG_AF5 and the seventh AF pixel group PG_AF7 are selected when the pixel array 110E is switched from the all pixel AF mode to the sparse AF mode. In this case, when the sparse AF mode is performed, a first AF pixel PX_AF1 of the fifth AF pixel group PG_AF5 may be selected to generate a first phase signal, and a second AF pixel PX_AF2 of the seventh AF pixel group PG_AF7 may be selected to generate a second phase signal. The ground control line GCL may be connected to an end of a photo diode PD1 of a first AF adjacent pixel PX_AFX1 and an end of a photo diode PD2 of a second AF adjacent pixel PX_AFX2. When an operation is performed in the sparse AF mode, a ground control signal GS having a high level may be provided to the end of the photo diode PD1 of the first AF adjacent pixel PX_AFX1 and the end of the photo diode PD2 of the second AF adjacent pixel PX_AFX2 through the ground control line GCL.

Figure 15:
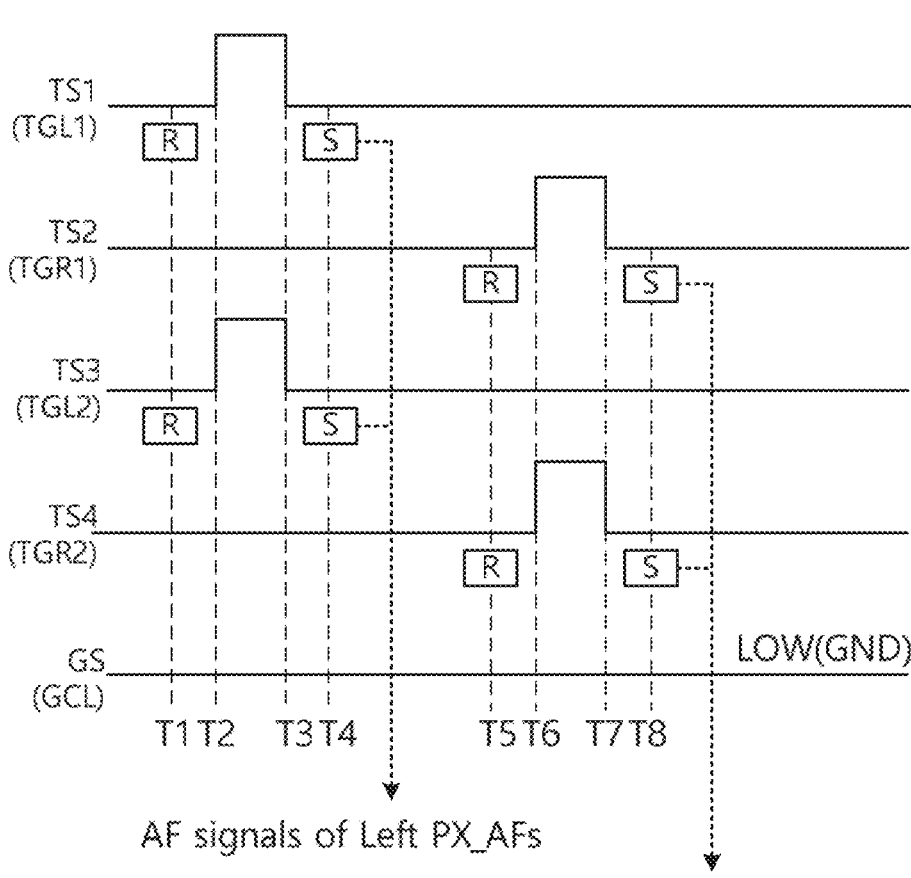
FIG. 15 is a timing chart illustrating an example of a case in which the pixel array of FIG. 14 operates in an all pixel AF mode.

FIG. 15 is a timing chart illustrating an example of a case in which the pixel array 110E of FIG. 14 operates in the all pixel AF mode.

First, while an operation is performed in the all pixel AF mode, a ground control signal GS having a ground level GND or a low level LOW is provided through the ground control line GCL. Accordingly, the photo diodes PD1 and PD2 of the first and second AF adjacent pixels PX_AFX1 and PX_AFX2 may be activated, and charges may be accumulated in the photo diodes PD1 and PD2.

At time T1, floating diffusion regions FD of the left AF pixels included in the respective AF pixel groups PG_AF1 to PG_AF8 are reset. The voltage levels of the reset floating diffusion regions FD are sampled and used as first reference voltages.

At time T2, a first transmission signal TS1 having a high level is provided through a first transmission gate line TGL1, and a third transmission signal TS3 having a high level is provided through a third transmission gate line TGL2.

Accordingly, transmission transistors of the left AF pixels included in the respective AF pixel groups are turned on, and charges accumulated in photo diodes PD move to the corresponding floating diffusion regions FD.

At time T3, the transmission transistors of the left AF pixels are turned off, and at time T4, the voltage levels of the floating diffusion regions FD are sampled. The sampled voltage levels of the floating diffusion regions FD are used as first signal voltages. By comparing the first signal voltages with the corresponding first reference voltages sampled at time T1, phase signals for the left AF pixels may be generated.

Thereafter, at time T5, floating diffusion regions FD of the right AF pixels included in the respective AF pixel groups PG_AF1 to PG_AF8 are reset. The voltage levels of the reset floating diffusion regions FD are sampled and used as second reference voltages.

At time T6, a second transmission signal TS2 having a high level is provided through a second transmission gate line TGR1, and a fourth transmission signal TS4 having a high level is provided through a fourth transmission gate line TGR2. Accordingly, transmission transistors of the right AF pixels included in the respective AF pixel groups are turned on, and charges accumulated in photo diodes PD move to the corresponding floating diffusion regions FD.

At time T7, the transmission transistors of the right AF pixels are turned off, and at time T8, the voltage levels of the floating diffusion regions FD are sampled. The sampled voltage levels of the floating diffusion regions FD are used as second signal voltages. By comparing the second signal voltages with the corresponding second reference voltages sampled at time T5, phase signals for the right AF pixels may be generated.

As described above, the image sensor according to the embodiment of the present disclosure may support the all pixel AF mode, thereby providing an accurate AF function.

Figure 16:
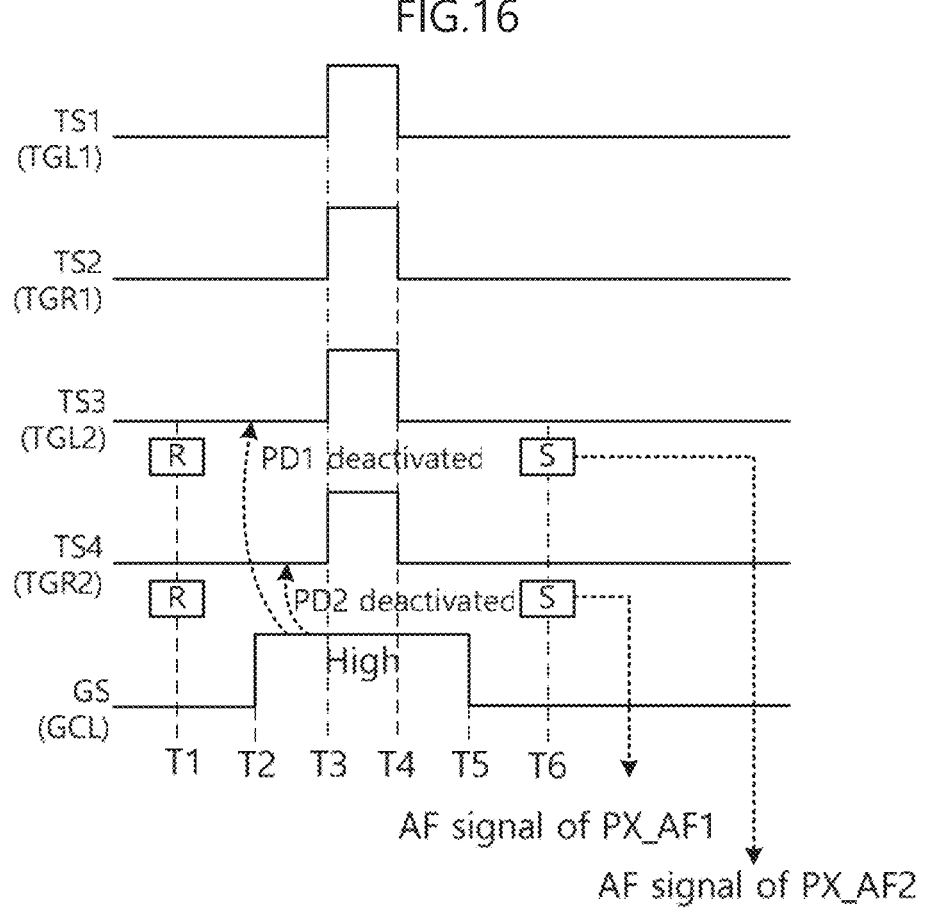
FIG. 16 is a timing chart illustrating an example of a case in which the pixel array of FIG. 14 operates in a sparse AF mode.

FIG. 16 is a timing chart illustrating an example of a case in which the pixel array 110E of FIG. 14 is switched to the sparse AF mode. For convenience of description, it is assumed that in the sparse AF mode, the first AF pixel PX_AF1 included in the fifth AF pixel group PG_AF5 is selected to generate a first phase signal and the second AF pixel PX_AF2 included in the seventh AF pixel group PG_AF7 is selected to generate a second phase signal.

At time T1, the floating diffusion regions FD of the first and second AF pixels PX_AF1 and PX_AF2 are reset. The voltage level of the reset floating diffusion region FD of the first AF pixel PX_AF1 is sampled and used as a first reference voltage, and the voltage level of the reset floating diffusion region FD of the second AF pixel PX_AF2 is sampled and used as a second reference voltage.

At time T2, a ground control signal GS having a high level may be provided to the photo diode PD1 of the first AF adjacent pixel PX_AFX1 and the photo diode PD2 of the second AF adjacent pixel PX_AFX2 through the ground control line GCL. Accordingly, the photo diodes PD1 and PD2 of the first and second AF adjacent pixels PX_AFX1 and PX_AFX2 are deactivated, and charges generated from the photo diodes PD1 and PD2 are drained toward the row driver 120 (refer to FIG. 1).

At time T3, a third transmission signal TS3 having a high level is provided through the third transmission gate line TGL2, and a fourth transmission signal TS4 having a high level is provided through the fourth transmission gate line TGR2. Accordingly, a transmission transistor TXL1 of the first AF adjacent pixel PX_AFX1 and a transmission transistor TXL2 of the second AF pixel PX_AF2 that are connected to the third transmission gate line TGL2 are turned on, and a transmission transistor TXR1 of the first AF pixel PX_AF1 and a transmission transistor TXR2 of the second AF adjacent pixel PX_AFx2 that are connected to the fourth transmission gate line TGR2 are turned on.

In this case, since charges are not accumulated in the first photo diode PD1 of the first AF adjacent pixel PX_AFX1, charges do not move from the first photo diode PD1 of the first AF adjacent pixel PX_AFX1 to the floating diffusion region FD even though the transmission transistor TXL1 is turned on by the third transmission signal TS3. Accordingly, only charges generated from the photo diode of the first AF pixel PX_AF1 move to the floating diffusion region FD as the transmission transistor TXR1 is turned on by the fourth transmission signal TS4.

Likewise, since charges are not accumulated in the second photo diode PD2 of the second AF adjacent pixel PX_AFX2, charges do not move from the second photo diode PD2 of the second AF adjacent pixel PX_AFX2 to the floating diffusion region FD even though the transmission transistor TXR2 is turned on by the fourth transmission signal TS4. Accordingly, only charges generated from the photo diode of the second AF pixel PX_AF2 move to the floating diffusion region FD as the transmission transistor TXL2 is turned on by the third transmission signal TS3.

Thereafter, at time T5, the third and fourth transmission signals TS3 and TS4 having a ground level are provided. Accordingly, the transmission transistors TXL1, TXR1, TXL2, and TXR2 are turned off, and at time T6, the floating diffusion region FD of the selected first AF pixel PX_AF1 and the floating diffusion region FD of the selected second AF pixel PX_AF2 are sampled. The voltage level of the sampled floating diffusion region FD of the first AF pixel PX_AF1 is used as a first signal voltage, and the voltage level of the sampled floating diffusion region FD of the second AF pixel PX_AF2 is used as a second signal voltage. Thereafter, the first phase signal is generated by comparing the first signal voltage with the first reference voltage, and the second phase signal is generated by comparing the second signal voltage with the second reference voltage. Thus, a phase difference in the first direction (the X direction) may be calculated.

As described above, the image sensor according to the embodiment of the present disclosure may be switched from the all pixel AF mode to the sparse AF mode. In particular, by supporting the sparse AF mode, the image sensor according to the embodiment of the present disclosure may rapidly calculate the phase difference.

For convenience of description, it is assumed in FIGS. 14 to 16 that each AF pixel group includes two AF pixels. However, this is an example, and it will be understood that each AF pixel group may include four, eight, or sixteen AF pixels.

[AF Pixel Group for Supporting Dual Conversion Gain Mode]

Figure 17:
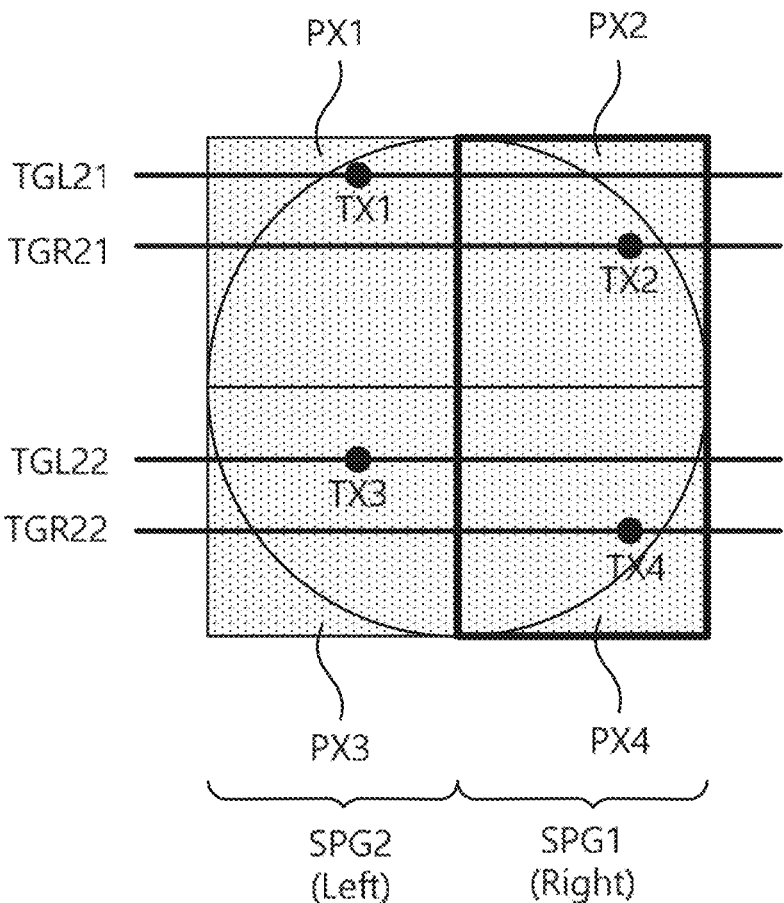
FIGS. 17 and 18 are views for describing a problem when an AF function is performed using a general pixel group including a dynamic range capacitor.
Figure 18:
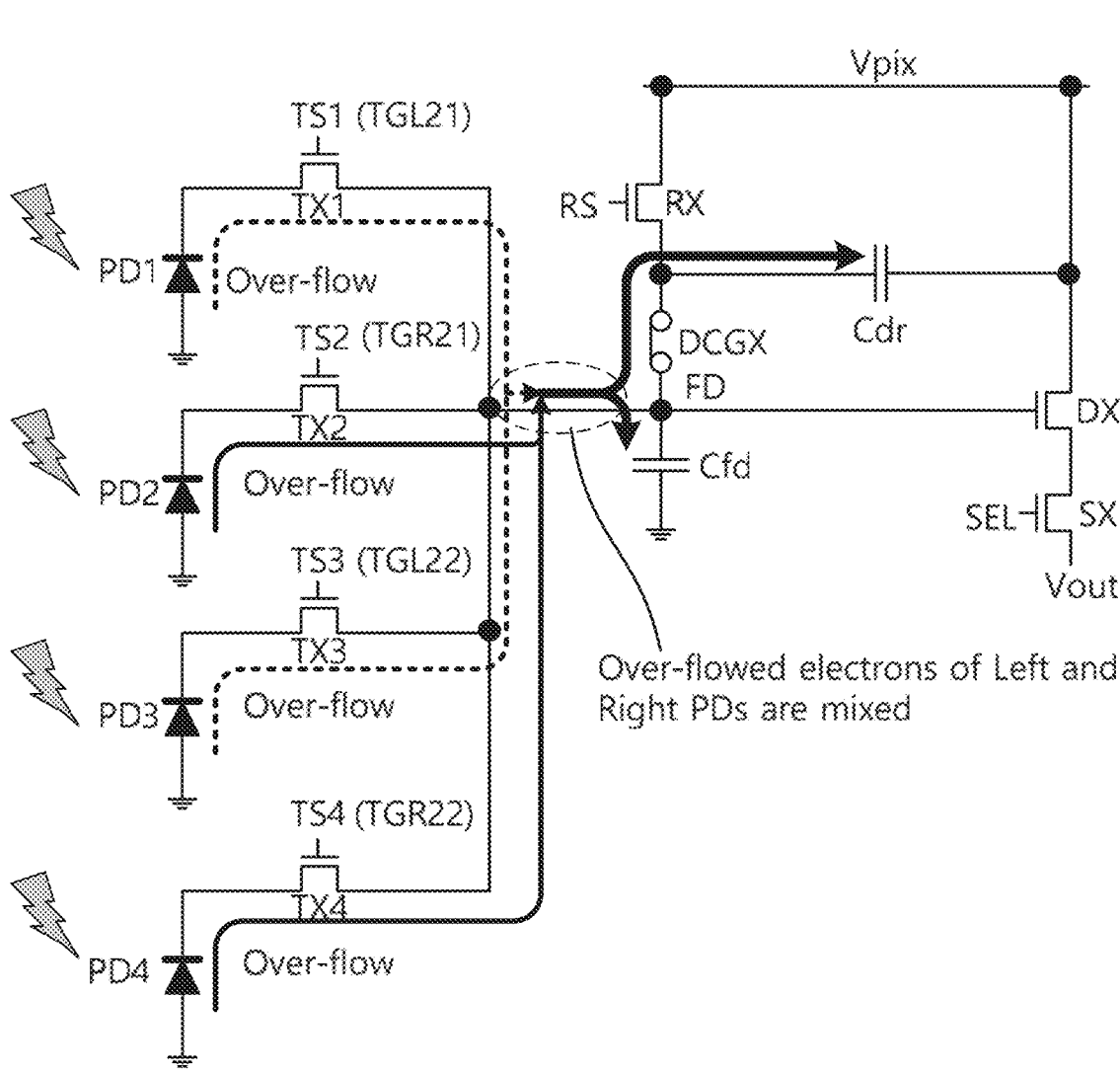

FIGS. 17 and 18 are views for describing a problem when an AF function is performed using a general pixel group including a dynamic range capacitor. For convenience of description, it is assumed that a pixel group PG includes four pixels that share one floating diffusion region FD.

Referring to FIG. 17, the pixel group PG includes first to fourth pixels PX1 to PX4. It is assumed that the pixels PX2 and PX4 disposed on the right side of the pixel group PG when viewed on a plane constitute a first sub-pixel group SPG1 and the pixels PX1 and PX3 disposed on the left side of the pixel group PG constitute a second sub-pixel group SPG2.

Referring to FIG. 18, the pixel group PG includes a dynamic range capacitor Cdr. The dynamic range capacitor Cdr may be provided to accommodate a large amount of charges that overflow from photo diodes PD1 to PD4 in a high illuminance mode.

In more detail, a large amount of charges exceeding the capacity of each of the photo diodes PD1 to PD4 may be generated in the high illuminance mode. In this case, an overflow phenomenon in which charges of the photo diodes PD1 to PD4 are transferred to a floating diffusion region FD in a state in which transmission transistors TX1 to TX4 are turned off may occur. A double conversion gain transistor DCGX may be turned on to accumulate the overflowing charges without discarding the overflowing charges. Accordingly, the overflowing charges may be stored in the dynamic range capacitor Cdr.

In this case, charges overflowing from the pixels PX2 and PX4 belonging to the first sub-pixel group SPG1 and charges overflowing from the pixels PX1 and PX3 belonging to the second sub-pixel group SPG2 are mixed with each other and stored in the dynamic range capacitor Cdr. In other words, the charges generated from the pixels PX2 and PX4 disposed on the right side in the first direction (the X direction) and the charges generated from the pixels PX1 and PX3 disposed on the left side are mixed without being separated from each other. Accordingly, when the general pixel group including the dynamic range capacitor is used for generating a phase signal, an accurate AF function may not be provided.

Figure 19:
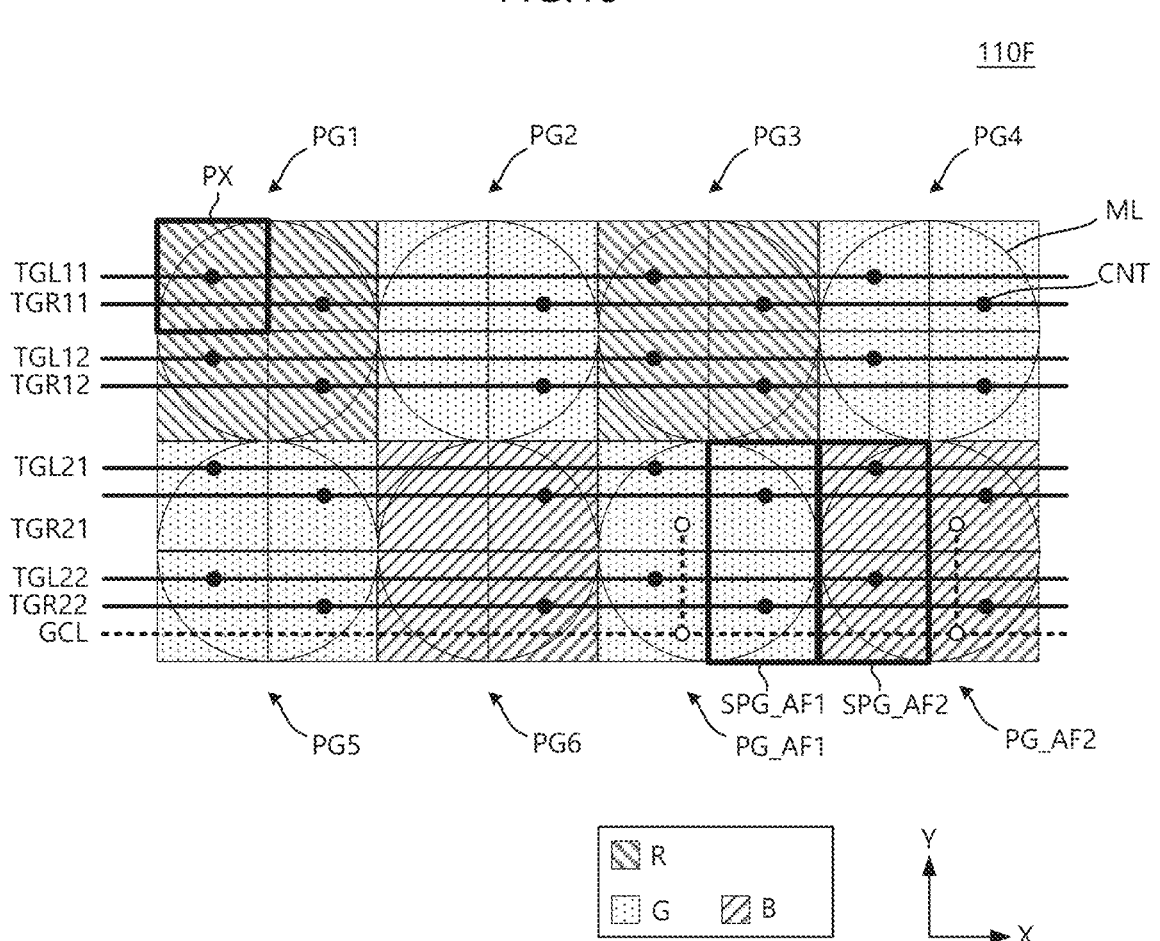
FIG. 19 is a view illustrating an example of a connection relationship between a pixel array supporting a wide dynamic range and the row driver according to an embodiment of the present disclosure.
Figure 20:
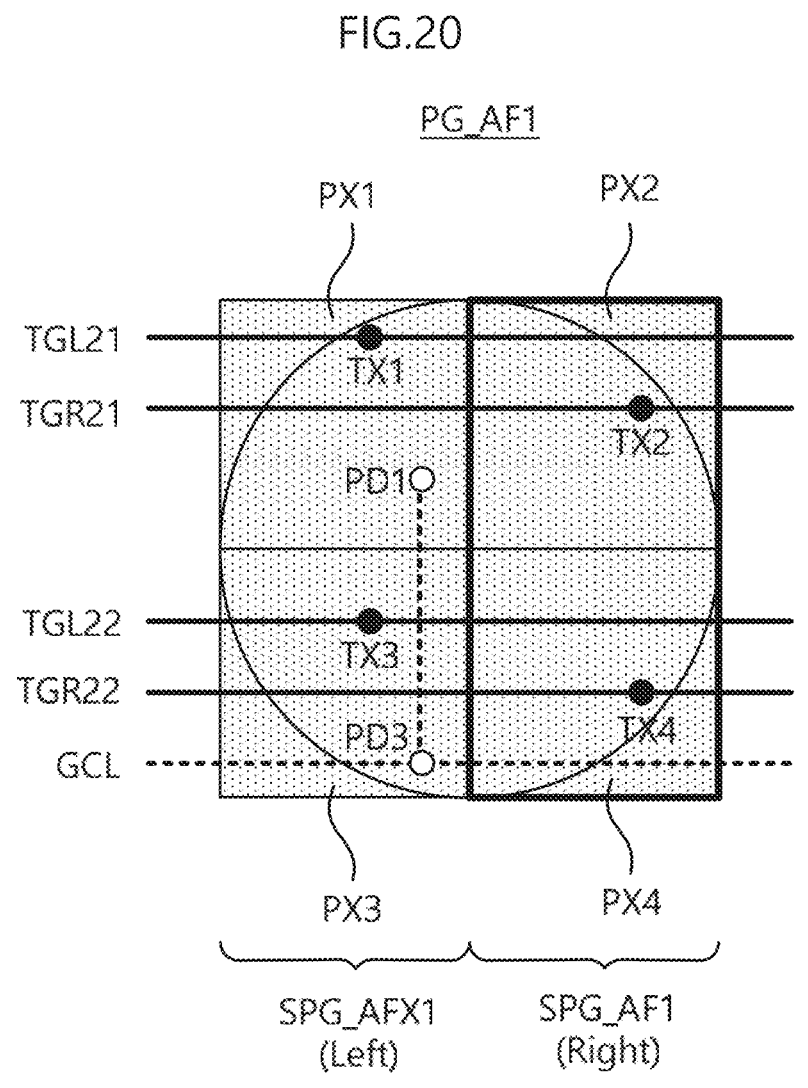

FIG. 19 is a view illustrating a connection relationship between a pixel array 110F supporting a wide dynamic range and the row driver 120 according to an embodiment of the present disclosure. FIG. 20 is a detailed view illustrating a connection relationship between a first AF pixel group PG_AF1 of the pixel array 110F of FIG. 19 and the row driver 120.

The connection relationship between the pixel array 110F of FIG. 19 and the row driver 120 is similar to the connection relationship between the pixel array 110A of FIG. 4 and the row driver 120. Therefore, repetitive descriptions will hereinafter be omitted. Furthermore, for convenience of description, an example in which each pixel group includes four pixels and a phase signal is generated in units of AF sub-pixels will be described below.

Referring to FIG. 19, the pixel array 110F includes first to sixth pixel groups PG1 to PG6 and first and second AF pixel groups PG_AF1 and PG_AF2. Each of the first to sixth pixel groups PG1 to PG6 includes four pixels PXs disposed in the first direction (the X direction) and the second direction (the Y direction), and the four pixels PXs share one micro lens ML. The pixels included in the first to sixth pixel groups PG1 to PG6 are connected to corresponding lines among transmission gate lines TGL11, TGR11, TGL12, TGR12, TGL21, TGR21, TGL22, and TGR22.

Similarly, each of the first and second AF pixel groups PG_AF1 and PG_AF2 includes four pixels disposed in the first direction (the X direction) and the second direction (the Y direction), and the four pixels share one micro lens ML. The pixels included in the first and second AF pixel groups PG_AF1 and PG_AF2 are connected to corresponding lines among the transmission gate lines TGL11, TGR11, TGL12, TGR12, TGL21, TGR21, TGL22, and TGR22.

Each of the first and second AF pixel groups PG_AF1 and PG_AF2 includes an AF sub-pixel group SPG_AF and an AF sub-adjacent pixel group SPG_AFX. Pixels included in the AF sub-adjacent pixel group SPG_AFX are connected to a ground control line GCL.

In more detail, referring to FIG. 20, the first AF pixel group PG_AF1 includes a first AF sub-pixel group SPG_AF1 and a first AF sub-adjacent pixel group SPG_AFX1. The first AF sub-pixel group SPG_AF1 includes pixels PX2 and PX4 located on the right side when viewed on a plane and is used to generate a first phase signal. The first AF sub-adjacent pixel group SPG_AFX1 includes pixels PX1 and PX3 located on the left side when viewed on the plane. Ends of photo diodes PD1 and PD3 included in the first AF sub-adjacent pixel group SPG_AFX1 may be connected to the ground control line GCL, and a ground level voltage or a high level voltage may be selectively provided through the ground control line GCL. In other words, end of the photo diodes PD1 and PD3 included in the first AF sub-adjacent pixel group SPG_AFX1 may be connected to each other.

Figure 21:
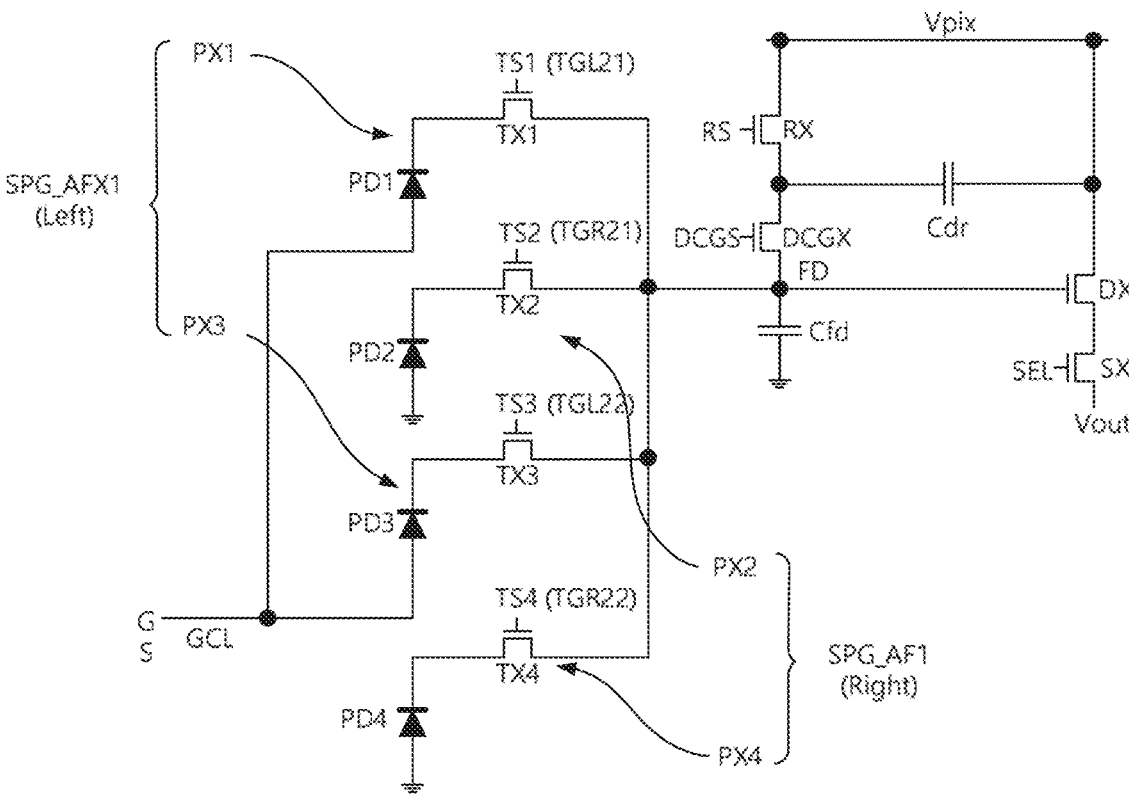
FIG. 21 is a circuit diagram illustrating an example of the first AF pixel group of FIG. 20.

FIG. 21 is a circuit diagram illustrating an example of the first AF pixel group PG_AF1 of FIG. 20. The circuit diagram of the first AF pixel group PG_AF1 of FIG. 21 is similar to the circuit diagram of the first AF pixel group of FIG. 6. Accordingly, repetitive descriptions will hereinafter be omitted for the sake of brevity.

Referring to FIG. 21, the first to fourth pixels PX1 to PX4 share one floating diffusion region FD. The second and fourth pixels PX2 and PX4 constitute the first AF sub-pixel group SPG_AF1, and ends of photo diodes PD2 and PD4 included in the second and fourth pixels PX2 and PX4 are connected to a ground GND. The first and third pixels PX1 and PX3 constitute the first AF sub-adjacent pixel group SPG_AFX1, and the ends of the photo diodes PD1 and PD3 included in the first and third pixels PX1 and PX3 are connected to the ground control line GCL. The row driver 120 may provide a ground control signal GS having a ground level or a high level to the first AF sub-adjacent pixel group SPG_AFX1 through the ground control line GCL.

To provide a wider dynamic range when performing an AF function, the first AF pixel group PG_AF1 of FIG. 21 further includes a dynamic range capacitor Cdr and a double conversion gain transistor DCGX, compared to the first AF pixel group of FIG. 6.

One end (e.g., a first end) of the dynamic range capacitor Cdr is connected between a reset transistor RX and the double conversion gain transistor DCGX. For example, the one end of the dynamic range capacitor Cdr is connected to a source of the reset transistor RX or a drain of the double conversion gain transistor DCGX, and an opposite end (e.g., a second end) of the dynamic range capacitor Cdr is connected to a power voltage (Vpix) terminal.

The dynamic range capacitor Cdr may be formed in a cylindrical shape similar to that of a memory capacitor of a dynamic random access memory (DRAM) to accommodate a large amount of charges overflowing from a photo diode in a high illuminance mode.

In the high illuminance mode, the reset transistor RX is turned off, and the double conversion gain transistor DCGX is turned on. Accordingly, the dynamic range capacitor Cdr is connected to the floating diffusion region FD, and the total capacity capable of accommodating charges is increased to the sum of the capacities of a floating diffusion region capacitor Cfd and the dynamic range capacitor Cdr. Accordingly, charges overflowing from a photo diode to the floating diffusion region FD in the high illuminance mode may be shared by the dynamic range capacitor Cdr. In other words, in the high illuminance mode, a large amount of charges overflowing from the photo diode may be accumulated by the dynamic range capacitor Cdr without being discarded.

Furthermore, in the high illuminance mode, the row driver 120 may provide the ground control signal GS having the high level to the ends of the photo diodes PD1 and PD3 included in the first AF sub-adjacent pixel SPG_AFX1. In this case, charges generated from the photo diodes PD1 and PD3 included in the first AF sub-adjacent pixel SPG_AFX1 are drained toward the row driver 120. In other words, since the charges generated from the photo diodes PD1 and PD3 included in the first AF sub-adjacent pixel SPG_AFX1 are drained toward the row driver 120, an overflow phenomenon does not occur in the first AF sub-adjacent pixel SPG_AFX1.

Accordingly, all of the charges overflowing in the high illuminance mode are charges generated from the photodiodes PD2 and PD4 included in the first AF sub-pixel group SPG_AF1. As a result, the problem described with reference to FIGS. 17 and 18 in which the charges overflowing from the left photo diodes and the charges overflowing from the right photo diodes are mixed with each other in the dynamic range capacitor Cdr may be overcome. The AF pixel group PG_AF1 according to the embodiment of the present disclosure may provide an AF function of a low conversion gain (LCG) by using the charges overflowing in the high illuminance mode without discarding the overflowing charges.

In a low illuminance mode, the double conversion gain transistor DCGX is turned off in response to a double conversion gain signal DCGS. Then, the dynamic range capacitor Cdr is electrically disconnected from the floating diffusion region FD. Accordingly, charges generated from a photo diode in the low illuminance mode are stored only in the floating diffusion region FD. Since the charges are stored in the capacitance provided by the floating diffusion region FD, a high conversion gain (HCG) and low noise characteristics may be provided.

Figure 22:
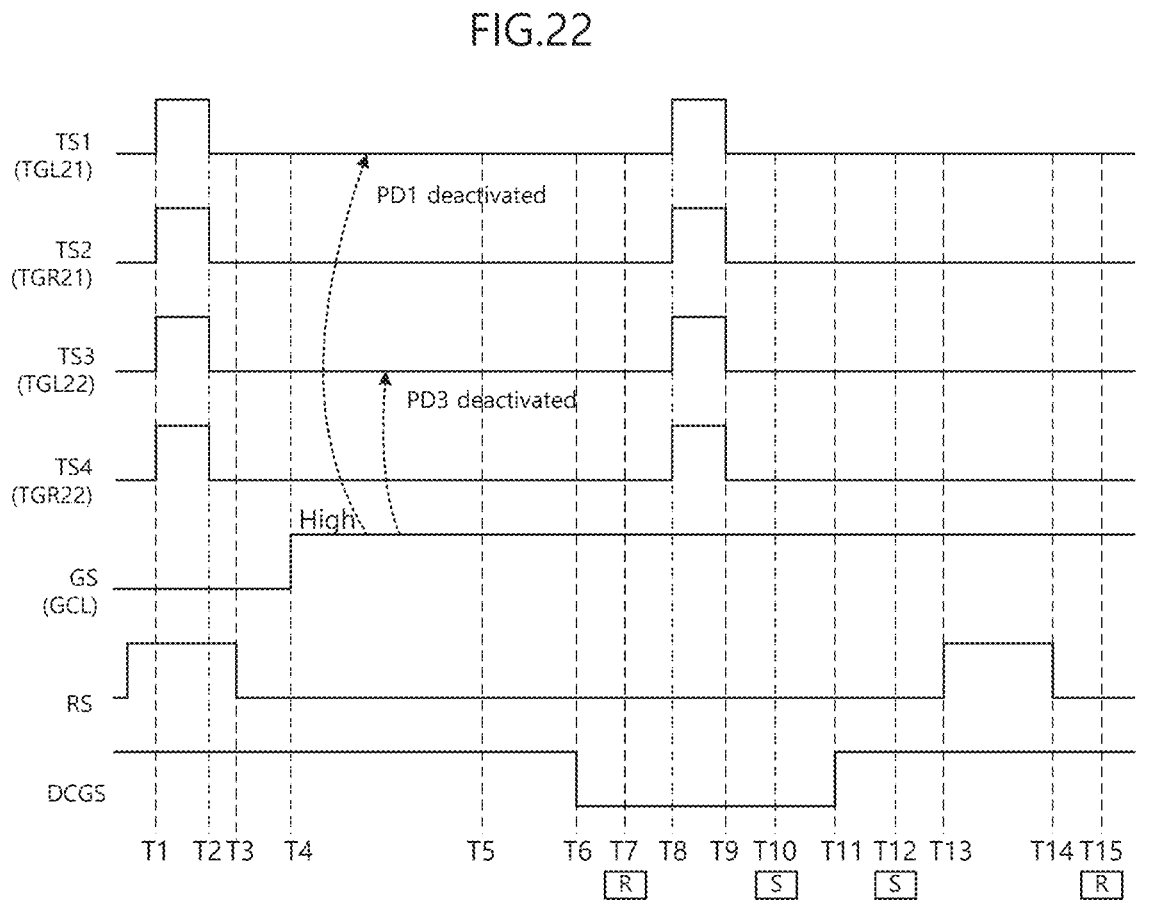

FIG. 22 is a timing chart for describing an operation of the first AF pixel group PG_AF1 of FIGS. 19 to 21, and FIG. 23 is a view illustrating an operation of the first AF pixel group PG_AF1 when overflow occurs.

At time T1, the double conversion gain transistor DCGX and the reset transistor RX are in a turned-on state. Accordingly, charges stored in the floating diffusion region transistor Cfd and the dynamic range capacitor Cdr are drained to the power voltage (Vpix) terminal, and the floating diffusion region capacitor Cfd and the dynamic range capacitor Cdr are reset. Furthermore, first to fourth transmission transistors TX1 to TX4 are also turned on in a state in which a ground control signal GS having a high level is provided through the ground control line GCL. Accordingly, the first to fourth photo diodes PD1 to PD4 are also reset.

At time T2, the first to fourth transmission transistors TX1 to TX4 are turned off. Accordingly, the first to fourth photo diodes PD1 to PD4 start to generate and accumulate charges.

At time T3, the reset transistor RX is turned off. At this time, the total capacity that the floating diffusion region FD is able to accommodate is equal to the sum of the capacities of the floating diffusion region capacitor Cfd and the dynamic range capacitor Cdr since the double conversion gain transistor DCGX is in the turned-on state.

At time T4, a ground control signal GS having a high level is provided. Accordingly, the first and third photo diodes PD1 and PD3 included in the first AF sub-adjacent pixel group SPG_AFX1 are deactivated, and the charges accumulated in the first and third photo diodes PD1 and PD3 are drained toward the row driver 120.

Figure 23:
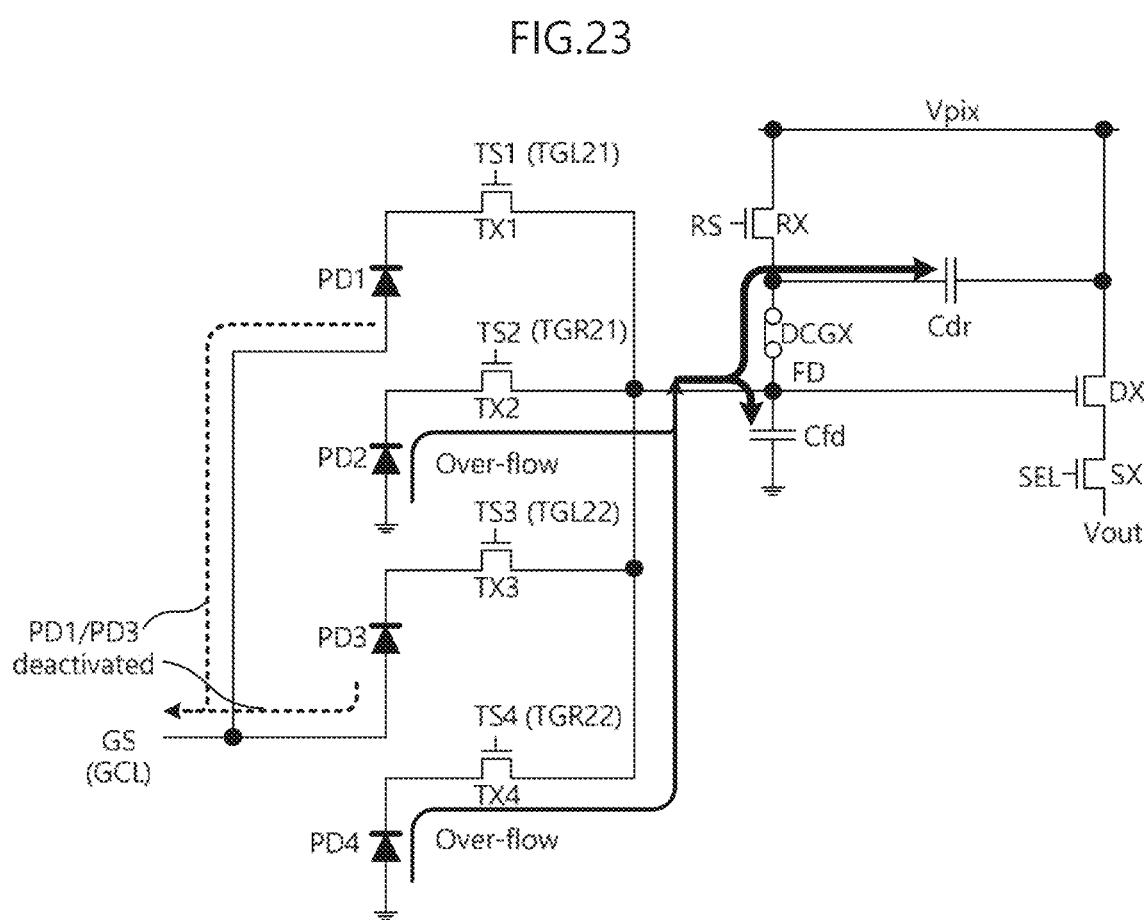
FIG. 23 is a view illustrating an operation of the first AF pixel group when overflow occurs.

At time T5, for example, overflow in the high illuminance mode may occur. In this case, as illustrated in FIG. 23, overflow occurs only in the second and fourth photo diodes PD2 and PD4 since the first and third photo diodes PD1 and PD3 included in the first AF sub-adjacent pixel group SPG_AFX1 are in the deactivated state. In this case, overflowing charges may be stored in the dynamic range capacitor Cdr since the double conversion gain transistor DCGX is in the turned-on state.

At time T6, the double conversion gain capacitor DCGX is turned off, and the dynamic range capacitor Cdr is electrically disconnected from the floating diffusion region FD. The double conversion gain capacitor DCGX may be turned off by a double conversion gain signal DCGS having a low level. Accordingly, the total capacity that the floating diffusion region FD is able to accommodate is equal to the capacity of the floating diffusion region capacitor Cfd.

At time T7, a sampling operation is performed on the voltage level of the floating diffusion region FD. This is used as a reference voltage in a high conversion gain (HCG) mode.

At time T8, the transmission transistors TX1 to TX4 are turned on. At this time, only the charges generated from the second and fourth photo diodes PD2 and PD4 included in the first AF sub-pixel group SPG_AF1 move to the floating diffusion region FD since the first and third photo diodes PD1 and PD3 are in the deactivated state.

At time T9, the transmission transistors TX1 to TX4 are turned off, and at time T10, a sampling operation is performed on the voltage level of the floating diffusion region FD. This is used as a signal voltage in the high conversion gain (HCG) mode. Accordingly, a phase signal in the high conversion gain (HCG) mode may be generated by using the reference voltage sampled at time T7 and the signal voltage sampled at time T9.

At time T11, the double conversion gain transistor DCGX is turned on. Accordingly, the dynamic range capacitor Cdr is electrically connected to the floating diffusion region FD.

At time T12, a sampling operation is performed on the floating diffusion region FD. This is used as a signal voltage in a low conversion gain (LCG) mode.

At time T13, the reset transistor RX is turned on. For example, the reset signal RS having a high level is applied to the gate of the reset transistor RX. Accordingly, the dynamic range capacitor Cdr and the floating diffusion region capacitor Cfd are reset.

At time T14, the reset transistor RX is turned off, and at time T15, a sampling operation is performed on the floating diffusion region FD. Since the total capacity of the floating diffusion region FD is increased by the dynamic range capacitor Cdr and the floating diffusion region capacitor Cfd, the sampled voltage level of the floating diffusion region FD is used as a reference voltage in the low conversion gain (LCG) mode. Thereafter, a phase signal in the low conversion gain (LCG) mode may be generated by using the signal voltage at time T12 and the reference voltage at time T15.

As described above, the image sensor according to the embodiment of the present disclosure may provide the dual conversion gain function of the low conversion gain mode and the high conversion gain mode even when performing an AF function. Accordingly, the image sensor according to the embodiment of the present disclosure may provide a more accurate AF function.

Figure 24:
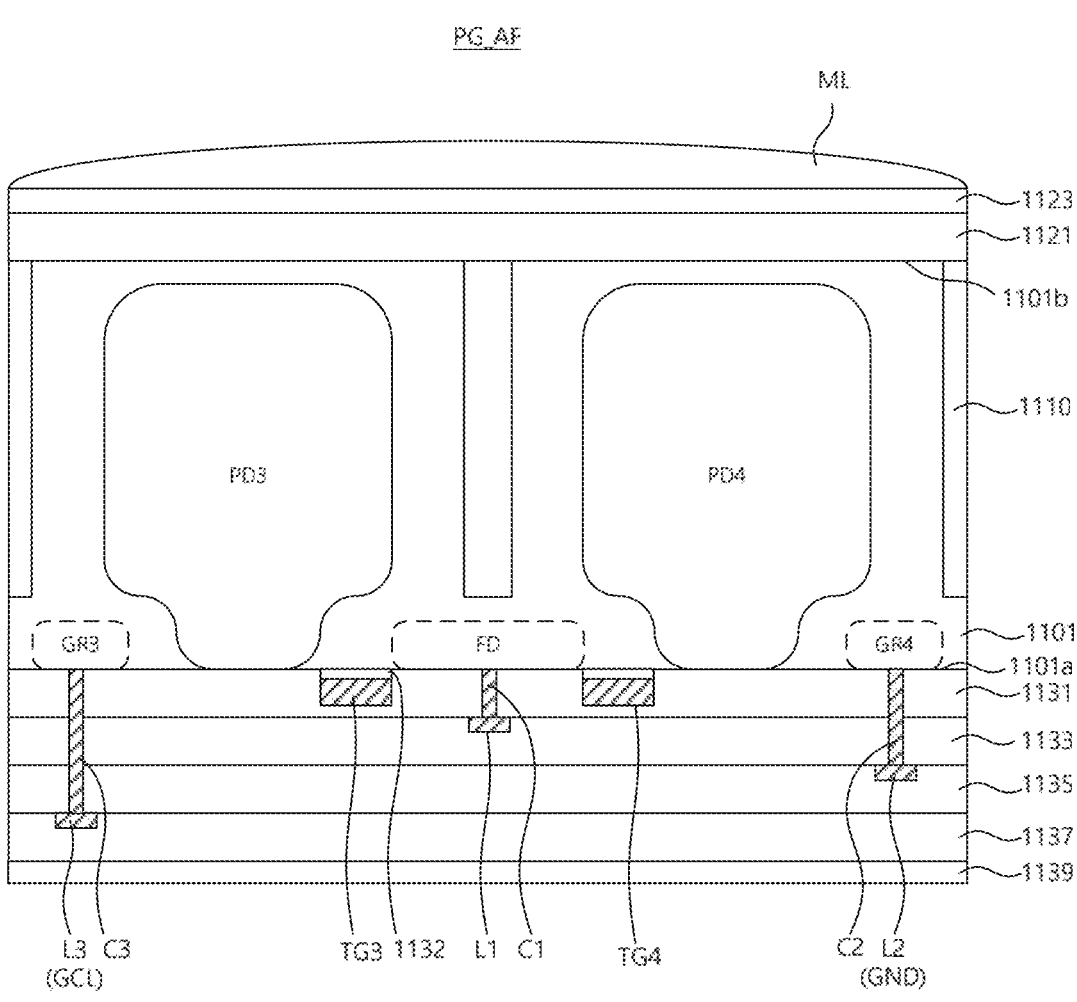
FIG. 24 is a sectional view illustrating an example of a vertical structure of an AF pixel group according to an embodiment of the present disclosure.

FIG. 24 is a sectional view illustrating an example of a vertical structure of an AF pixel group according to an embodiment of the present disclosure. For example, a vertical structure for the first AF pixel PX_AF1 and the third AF adjacent pixel PX_AFX3 of the first AF pixel group PG_AF1 of FIG. 5 is illustrated in FIG. 24.

Referring to FIG. 24, the AF pixel group PG_AF may include a substrate 1101, photo diodes PD3 and PD4, ground regions GR3 and GR4, a floating diffusion region FD, a deep device isolator 1110, transmission gates TG3 and TG4, contacts C1, C2, and C3, signal lines L1, L2, and L3, a gate insulating layer 1132, first, second, third and fourth interlayer insulating layers 1131, 1133, 1135, and 1137, a color filter 1121, a light transmitting layer 1123, and a micro lens ML.

The substrate 1101 includes a first surface 1101a and a second surface 1101b facing away from each other. The transmission gates TG3 and TG4 and the signal lines L1 to L3 are disposed on the first surface 1101a. The color filter 1121, the light transmitting layer 1123, and the micro lens ML are disposed on the second surface 1101b, and light is incident through the second surface 1101b. For example, the first surface 1101a may be a front surface, the second surface 1101b may be a rear surface, and an image sensor including the AF pixel group PG_AF may be a backside illuminated image sensor (BIS) that operates in response to the incident light incident through the rear surface of the substrate 1101.

The photo diodes PD3 and PD4 may be disposed adjacent to both the first and second surfaces 1101a and 1101b of the substrate 1101 and may generate charges by performing photoelectric conversion based on the incident light.

The transmission gates TG3 and TG4 may be disposed on the first surface 1101a of the substrate 1101 with the gate insulating layer 1132 interposed therebetween and may transfer the charges generated from the photo diodes PD3 and PD4 to the floating diffusion region FD.

The floating diffusion region FD is disposed adjacent to the first surface 1101a of the substrate 1101. The floating diffusion region FD may be shared by the photo diodes PD3 and PD4 and, for example, may be disposed between the third photo diode PD3 and the fourth photo diode PD4. The floating diffusion region FD may accumulate charges received from at least one of the photo diodes PD3 and PD4, and a phase signal may be generated based on the amount of charges transferred to the floating diffusion region FD.

The deep device isolator 1101 is disposed inside the substrate 1101. The deep device isolator 1101 vertically extends from the second surface 1101b of the substrate 1101 to penetrate the substrate 1101 and separates the photo diodes PD3 and PD4 from each other. The deep device isolator 1101 may not make direct contact with the first surface 1101a of the substrate 1101. The deep device isolator 110 may have a deep trench isolation (DTI) structure formed to be relatively deep and may have a mesh structure when viewed on a plane.

The plurality of ground regions GR3 and GR4 are disposed inside the substrate 1101 to be adjacent to the first surface 1101a of the substrate 1101. The third ground region GR3 corresponds to, for example, the third AF adjacent pixel PX_AFX3 of FIG. 5 and is disposed adjacent to the third photo diode PD3. A ground control signal GS having a ground level or a high level may be applied to the third ground region GR3. The fourth ground region GR4 corresponds to, for example, the AF pixel PX_AF of FIG. 5 and is disposed adjacent to the fourth photo diode PD4. A ground voltage is applied to the fourth ground region GR4.

The first surface 1101a of the substrate 1101 may be covered by the first interlayer insulating layer 1131. The first interlayer insulating layer 1131 may be penetrated by the first contact C1. The first contact C1 may be in contact with the floating diffusion region FD. The first signal line L1 in contact with the first contact C1 may be disposed on the first interlayer insulting layer 123.

The first interlayer insulating layer 1131 and the first signal line L1 may be covered by the second interlayer insulating layer 1133. The first and second interlayer insulating layers 1131 and 1133 may be penetrated by the second contact C2. The second contact C2 may be in contact with the fourth ground region GR4. The second signal line L2 in contact with the second contact C2 may be disposed on the second interlayer insulting layer 1133. Accordingly, the ground voltage may be provided to the fourth ground region GR4 through the second signal line L2 and the second contact C2.

The second interlayer insulating layer 1133 and the second signal line L2 may be covered by the third interlayer insulating layer 1135. The first to third interlayer insulating layers 1131, 1133, and 1135 may be penetrated by the third contact C3. The third contact C3 may be in contact with the third ground region GR3. The third signal line L3 in contact with the third contact C3 may be disposed on the third interlayer insulting layer 1135. The third signal line L3 may correspond to, for example, the ground control line GCL of FIG. 5. Accordingly, the ground control signal GS having the ground level or the high level may be provided to the third ground region GR3 through the third signal line L3 and the third contact C3. The fourth interlayer insulating layer 1137 and the third signal line L3 may be covered by a passivation layer 1139.

In an embodiment, the second signal line L2 may be formed in a mesh structure when viewed on the plane. In another embodiment, the second signal line L2 may be connected to a ground line formed in a mesh structure. Accordingly, the ground voltage may be stably provided to the ground region GR4 through the second signal line L2.

In an embodiment, the third signal line L3 may be formed on a different layer from the second signal line L2. The third signal line L3 may extend in one direction and may be connected to the row driver 120 (refer to FIG. 1). Accordingly, the row driver 120 may selectively provide a ground level voltage or a high level voltage to an AF adjacent pixel depending on operating modes.

Still referring to FIG. 24, the color filter 1121 may be disposed on the second surface 1101b of the substrate 1101. For example, the color filter 1121 may be one of a red filter, a green filter, and a blue filter. However, this is an example, and an AF pixel PX_AF supporting an auto focusing function may not include a color filter.

The light transmitting layer 1123 may be disposed on the color filter 1121, and the micro lens ML may be disposed on the light transmitting layer 1123. The micro lens ML may adjust the path of the incident light such that the incident light incident on the micro lens ML is focused on the photo diodes PD3 and PD4.

A light blocking pattern may be additionally disposed on the second surface 1101b of the substrate 1101. For example, the light blocking pattern may be disposed only in a position corresponding to the AF adjacent pixel and may make an adjustment such that the amount of light incident on the AF adjacent pixel is less than the amount of light incident on the AF pixel.

In addition, a dynamic range capacitor Cdr may be further included. For example, the dynamic range capacitor Cdr may be disposed on the passivation layer 1139 and may be formed in the form of a memory capacitor of a DRAM. In other words, the dynamic range capacitor Cdr may be formed of at least one cylindrical capacitor. Accordingly, the effective surface area of the capacitor may be increased, and thus the dynamic range capacitor Cdr may have a large capacity.

It has been described in FIG. 24 that the second signal line L2 and the third signal line L3 are formed on different layers. However, this is an example, and in some embodiments, the second signal line L2 and the third signal line L3 may be formed on the same layer.

The image sensor according to the present disclosure may prevent charges generated from the AF adjacent pixel from being mixed with charges generated from the AF pixel, thereby providing an accurate AF function.

While the present disclosure has been described with reference to embodiments thereof, it will be apparent to those of ordinary skill in the art that various changes and modifications can be made thereto without departing from the spirit and scope of the present disclosure as set forth in the following claims.

What is claimed is:

1. An image sensor, comprising:
a pixel array including an auto focusing (AF) pixel and an AF adjacent pixel, which is adjacent to the AF pixel and is configured to share a floating diffusion region with the AF pixel; and
a row driver configured to control the pixel array,
wherein a first end of a photo diode included in the AF pixel is connected to a first transmission transistor, and a second end of the photo diode included in the AF pixel is connected to a ground through a first signal line, and
wherein a first end of a photo diode included in the AF adjacent pixel is connected to a second transmission transistor, and a second end of the photo diode included in the AF adjacent pixel is connected to the row driver through a second signal line.

2. The image sensor of claim 1, wherein the row driver provides a high level voltage to the photo diode included in the AF adjacent pixel through the second signal line.

3. The image sensor of claim 2, wherein charges generated from the photo diode included in the AF adjacent pixel are drained toward the row driver.

4. The image sensor of claim 1, wherein the pixel array includes:
a plurality of pixel groups configured to generate an image signal; and
a plurality of AF pixel groups disposed between the plurality of pixel groups and configured to generate a phase signal,
wherein at least one of the plurality of AF pixel groups includes:
an AF pixel configured to generate a phase signal; and
a first AF adjacent pixel disposed adjacent to the AF pixel in a first direction, and
wherein a first end of a first photo diode included in the first AF adjacent pixel is connected to the row driver through the second signal line.

5. The image sensor of claim 4, wherein the at least one of the plurality of AF pixel groups further includes:
a second AF adjacent pixel disposed adjacent to the AF pixel in a second direction different from the first direction; and
a third AF adjacent pixel disposed adjacent to the AF pixel in a third direction different from the first and second directions, and
wherein a first end of a second photo diode included in the second AF adjacent pixel and a first end of a third photo diode included in the third AF adjacent pixel are connected to the row driver through the second signal line.

6. The image sensor of claim 5, wherein a first transmission transistor included in the first AF adjacent pixel, a second transmission transistor included in the second AF adjacent pixel, a third transmission transistor included in the third AF adjacent pixel, and a fourth transmission transistor included in the AF pixel are sequentially turned on while a ground level voltage is provided through the second signal line.

7. The image sensor of claim 5, wherein a first transmission transistor included in the first AF adjacent pixel, a second transmission transistor included in the second AF adjacent pixel, a third transmission transistor included in the third AF adjacent pixel, and a fourth transmission transistor included in the AF pixel are simultaneously turned on while a high level voltage is provided through the second signal line.

8. The image sensor of claim 1, wherein the pixel array includes a plurality of AF pixel groups, wherein each of the plurality of AF pixel groups includes:

an AF pixel configured to generate a first phase signal for a first direction; and an AF adjacent pixel disposed adjacent to the AF pixel and configured to generate a second phase signal for the first direction, and wherein a first end of a photo diode included in the AF adjacent pixel is connected to the row driver through the second signal line.

9. The image sensor of claim 8, wherein a first transmission transistor included in the AF pixel and a second transmission transistor included in the AF adjacent pixel are sequentially turned on while a ground level voltage is provided through the second signal line.

10. The image sensor of claim 8, wherein a first transmission transistor included in the AF pixel and a second transmission transistor included in the AF adjacent pixel are simultaneously turned on while a high level voltage is provided through the second signal line.

* * * * *